United States Patent
Lee et al.

(10) Patent No.: US 12,501,174 B2
(45) Date of Patent: Dec. 16, 2025

(54) IMAGE ACQUISITION APPARATUS AND METHOD USING COLOR SEPARATION LENS ARRAY

(71) Applicant: SAMSUNG ELECTRONICS CO., LTD., Suwon-si (KR)

(72) Inventors: Sangyun Lee, Suwon-si (KR); Sookyoung Roh, Suwon-si (KR); Seokho Yun, Suwon-si (KR); Junho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 18/241,660

(22) Filed: Sep. 1, 2023

(65) Prior Publication Data

US 2024/0080577 A1 Mar. 7, 2024

(30) Foreign Application Priority Data

Sep. 2, 2022 (KR) ......................... 10-2022-0111461

(51) Int. Cl.
*H04N 23/84* (2023.01)
*G06T 3/4015* (2024.01)
(Continued)

(52) U.S. Cl.
CPC ......... *H04N 23/843* (2023.01); *G06T 3/4015* (2013.01); *G06T 5/10* (2013.01); *H10F 39/8053* (2025.01); *G06T 2207/10024* (2013.01)

(58) Field of Classification Search
CPC ...... H04N 23/843; H04N 25/10; H04N 23/54; H04N 23/55; H04N 23/83; H04N 23/88;
(Continued)

(56) References Cited

U.S. PATENT DOCUMENTS

| 3,971,065 A | 7/1976 | Bayer |
| 7,728,844 B2 | 6/2010 | Trimeche et al. |

(Continued)

FOREIGN PATENT DOCUMENTS

| KR | 10-0637272 B1 | 10/2006 |
| KR | 10-1794726 B1 | 11/2017 |

(Continued)

OTHER PUBLICATIONS

Nishiwaki, Seiji et al., "Efficient colour splitters for high-pixel-density image sensors", Nature Photonics, vol. 7, Mar. 2013, pp. 240-246. (7 pages total).

(Continued)

*Primary Examiner* — Michael S Osinski
(74) *Attorney, Agent, or Firm* — Sughrue Mion, PLLC

(57) ABSTRACT

An image acquisition apparatus according to an example embodiment includes an image sensor including a sensor substrate including a plurality of photo-sensing cells for sensing light thereon, and a color separation lens array disposed in front of the sensor substrate and including a nanostructure to separate incident light by color, wherein the nanostructure forms a phase distribution in a plurality of regions facing the plurality of photo-sensing cells, respectively, and the phase distribution is formed so as to condense light of different wavelengths onto photo-sensing cells adjacent to each other, and a processor configured to process an image signal for each color obtained from the image sensor. The processor is further configured to perform decoupling with respect to sensing signals of the plurality of photo-sensing cells by using a kernel defined from a point spread function determined by the phase distribution.

20 Claims, 40 Drawing Sheets

(51) Int. Cl.
*G06T 5/10* (2006.01)
*H10F 39/00* (2025.01)

(58) Field of Classification Search
CPC .... H04N 25/11; H04N 25/134; H04N 25/133; H04N 9/646; H04N 25/135; H04N 25/13; H04N 25/131; H04N 2209/046; H04N 23/45; H04N 25/00; H04N 25/70; H04N 25/704; G06T 3/4015; G06T 5/10; G06T 2207/10024; G06T 3/4007; G06T 1/0007; G06T 2207/20024; G06T 2207/20192; G06T 3/4053; G06T 5/20; G06T 5/73; H10F 39/8053; H10F 39/8063; H10F 39/182; H10F 39/18; H10F 39/806; G02B 27/1013; G02B 5/201

See application file for complete search history.

(56) References Cited

U.S. PATENT DOCUMENTS

| | | | |
|---|---|---|---|
| 8,289,422 B2 | 10/2012 | Hiramoto et al. | |
| 8,878,967 B2 | 11/2014 | Susanu et al. | |
| 9,210,387 B2* | 12/2015 | Hayashi | H04N 25/133 |
| 10,339,637 B2 | 7/2019 | Watanabe | |
| 10,721,470 B2* | 7/2020 | Foessel | G06T 3/4015 |
| 11,553,146 B2* | 1/2023 | Lee | H04N 23/843 |
| 11,972,538 B2* | 4/2024 | Swami | G06T 3/4015 |
| 2008/0303919 A1* | 12/2008 | Egawa | H10F 39/8063 348/223.1 |
| 2012/0206637 A1 | 8/2012 | Hiramoto et al. | |
| 2012/0274786 A1* | 11/2012 | Wang | H04N 17/002 348/187 |
| 2014/0327783 A1* | 11/2014 | Nishiwaki | H04N 25/131 257/432 |
| 2015/0264333 A1* | 9/2015 | Ishiga | H04N 13/218 382/154 |
| 2016/0073088 A1* | 3/2016 | Cohen | G01S 17/894 348/46 |
| 2016/0225125 A1* | 8/2016 | Zhang | G06T 3/4007 |
| 2016/0255266 A1* | 9/2016 | Nakagata | H04N 23/67 348/241 |
| 2016/0259758 A1 | 9/2016 | Khemka et al. | |
| 2016/0277658 A1* | 9/2016 | Kim | H04N 25/704 |
| 2016/0277721 A1* | 9/2016 | Roffet | H04N 9/646 |
| 2016/0323518 A1* | 11/2016 | Rivard | H04N 23/631 |
| 2017/0070689 A1* | 3/2017 | Silverstein | H04N 25/671 |
| 2017/0374306 A1* | 12/2017 | Vaartstra | H04N 25/704 |
| 2018/0139378 A1* | 5/2018 | Moriuchi | H04N 23/95 |
| 2019/0094408 A1* | 3/2019 | Boyarsky | G06T 5/73 |
| 2019/0139189 A1* | 5/2019 | Srinivasamurthy | G06T 3/4007 |
| 2019/0318451 A1* | 10/2019 | Swami | G06T 3/4015 |
| 2020/0090306 A1 | 3/2020 | Cho et al. | |
| 2021/0125301 A1* | 4/2021 | Park | G06T 1/0007 |
| 2021/0227189 A1* | 7/2021 | Tang | H04N 23/843 |
| 2021/0297608 A1* | 9/2021 | Ma | H04N 23/843 |
| 2022/0150453 A1* | 5/2022 | Lee | H04N 9/646 |
| 2022/0222912 A1* | 7/2022 | Hanada | G06V 10/143 |
| 2022/0224866 A1* | 7/2022 | Ito | G02B 5/20 |
| 2022/0397791 A1 | 12/2022 | Yang et al. | |
| 2023/0230191 A1 | 7/2023 | Park et al. | |
| 2024/0063241 A1 | 2/2024 | Mun et al. | |
| 2024/0063242 A1 | 2/2024 | Yun et al. | |
| 2024/0079429 A1 | 3/2024 | Ahn et al. | |
| 2024/0079430 A1 | 3/2024 | Cho et al. | |
| 2024/0121488 A1* | 4/2024 | Miyata | G06N 3/02 |
| 2024/0288622 A1* | 8/2024 | Araki | H10F 30/20 |
| 2025/0209589 A1* | 6/2025 | Chen | G06T 5/60 |

FOREIGN PATENT DOCUMENTS

| | | |
|---|---|---|
| KR | 10-2020-0031012 A | 3/2020 |
| KR | 10-2021-0049670 A | 5/2021 |
| KR | 10-2022-0110783 A | 8/2022 |

OTHER PUBLICATIONS

Leung, Brian et al., "Least-Squares Luma-Chroma Demultiplexing Algorithm for Bayer Demosaicking", IEEE Transactions on Image Processing, vol. 20, No. 7, Jul. 2011, pp. 1885-1894. (10 pages total).

Condat, Laurent, "A Generic Variational Approach for Demosaicking From an Arbitrary Color Filter Array", IEEE, ICIP 2009, pp. 1625-1628. (4 pages total).

Communication issued Oct. 11, 2023 by the Korean Intellectual Property Office in Korean Patent Application No. 10-2022-0111461.

* cited by examiner

$|\nabla G|/G$

|∇G|/G Threshold map

|∇G|/G + |G| Threshold map

IMAGE ACQUISITION APPARATUS AND METHOD USING COLOR SEPARATION LENS ARRAY

CROSS-REFERENCE TO RELATED APPLICATION

This application is based on and claims priority under 35 U.S.C. § 119 to Korean Patent Application No. 10-2022-0111461, filed on Sep. 2, 2022, in the Korean Intellectual Property Office, the disclosure of which is incorporated by reference herein in its entirety.

BACKGROUND

1. Field

The disclosure relates to an image acquisition apparatus and a method acquisition method, and in particular, to image acquisition apparatus including a color separation lens array.

2. Description of the Related Art

In an image sensor, red, green, and blue color filters are arranged in a uniform pattern on a photo-sensing pixel to capture a color image. Also, considering that the human visual/luminous characteristics is sensitive to green color, a Bayer Pattern structure, which is cross-arranged so that green becomes 50% and each of red and blue becomes 25%, is used in the image sensor.

In order to compose a color image using the captured green, red, and blue images (raw images), an interpolation method using color values of neighboring pixels as color values of empty pixels of each color is used. Interpolating the color of each pixel from the raw image is called demosaicing.

Related art methods for demosaicing a Bayer raw image are optimized for the case where only the light component corresponding to the color of the corresponding pixel among the incident light of the unit pixel is incident on the photo-sensing surface by using a micro lens and an absorption type color filter.

On the other hand, the number of pixels of an image sensor is gradually increasing, and accordingly, pixel miniaturization is required, and securing the amount of light and removing noise are important issues for pixel miniaturization.

SUMMARY

Provided are an image acquisition apparatus and method capable of improving light utilization efficiency and securing spatial resolution of an image by applying a color separation lens array capable of separating incident light by wavelength and condensing the separated incident light.

Additional aspects will be set forth in part in the description which follows and, in part, will be apparent from the description, or may be learned by practice of the presented embodiments of the disclosure.

According to an aspect of the disclosure, there is provided an image acquisition apparatus including: an image sensor including: a sensor substrate comprising a plurality of photo-sensing cells configured to sense light, and a color separation lens array provided in front of the sensor substrate, the color separation lens array comprising a nanostructure configured to separate incident light by color, wherein the nanostructure is configured to form a phase distribution in a plurality of regions facing the plurality of photo-sensing cells, respectively, and the phase distribution is formed so as to condense light of different wavelengths onto photo-sensing cells adjacent to each other, and a processor configured to process an image signal for each of a plurality of colors obtained from the image sensor by decoupling sensing signals of the plurality of photo-sensing cells based on a kernel defined from a point spread function determined by the phase distribution.

According to another aspect of the disclosure, there is provided an image acquisition method in an image acquisition apparatus including an image senor having a sensor substrate with a plurality of photo-sensing cells for sensing light, and a color separation lens array provided in front of the sensor substrate, the method including: obtaining a raw image for each of a plurality of colors with the image sensor; processing the raw image obtained from the image sensor by decoupling sensing signals of the plurality of photo-sensing cells based on a kernel defined from a point spread function determined by the phase distribution; and performing demosaicing based on the decoupled sensing signal.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8D shows an example of a micro lens array equivalent to the color separation lens array for blue light.

DETAILED DESCRIPTION

Figure 1:
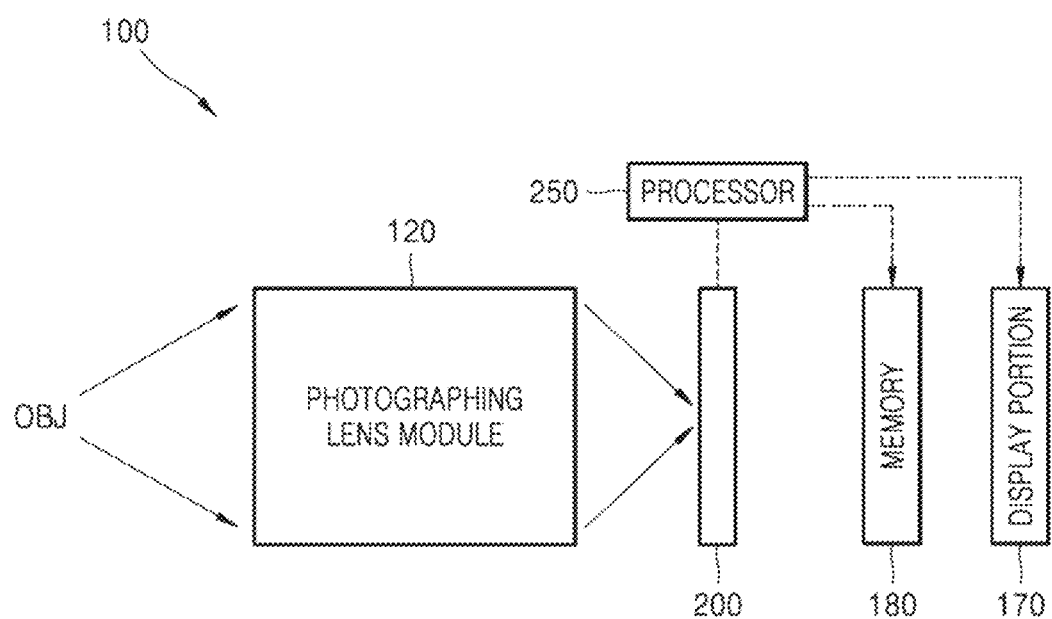
FIG. 1 schematically shows the configuration of an image acquisition apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail with reference to the accompanying drawings. In the following drawings, the same reference numerals refer to the same components, and the size of each component in the drawings may be exaggerated for clarity and convenience of description. The embodiments described below are merely exemplary, and various modifications are possible from these embodiments.

Hereinafter, what is described as "upper portion" or "upper" may include not only directly on in contact, but also on non-contacting. The singular expression includes the plural expression unless the context clearly dictates otherwise. Also, when a part "includes" a certain component, it means that other components may be further included, rather than excluding other components, unless otherwise stated. The use of the term "above" and similar referential terms may be used in both the singular and the plural.

FIG. 1 schematically shows the configuration of an image acquisition apparatus according to an example embodiment.

Referring to FIG. 1, an image acquisition apparatus 100 includes an image sensor 200 that converts the optical image formed by a photographing lens module 120 for condensing light reflected from an object OBJ to form an optical image into an electrical signal to obtain an image signal for each color and a processor 250 that generates a color image by processing image signals for each color obtained from the image sensor 200. The image acquisition apparatus 100 may further include a display 170 that displays the image formed by the processor 250, a memory 180 that stores the image formed by the processor 250, and the like. An additional optical element, for example, an infrared cut filter, may be further disposed between the image sensor 200 and the photographing lens module 120.

Figure 2:
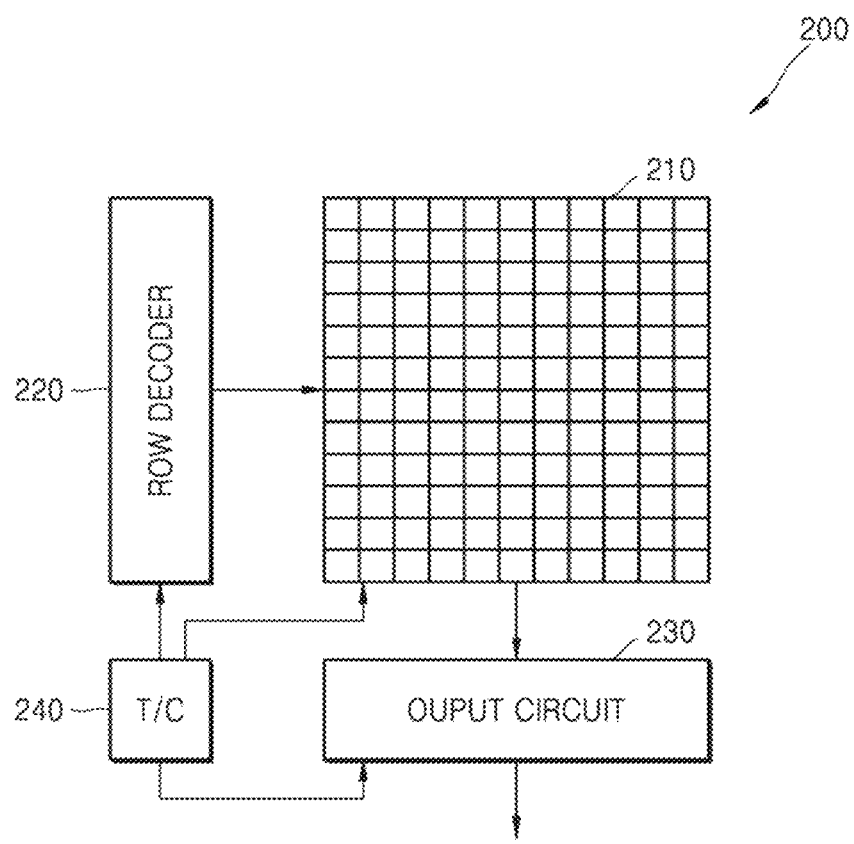
FIG. 2 is a block diagram of an image sensor according to an example embodiment.

FIG. 2 is a schematic block diagram of an image sensor according to an example embodiment.

Referring to FIG. 2, the image sensor 200 may include a pixel array 210, a row decoder 220, an output circuit 230 and a timing controller (T/C) 240. The image sensor 200 may be a charge coupled device (CCD) image sensor or a complementary metal oxide semiconductor (CMOS) image sensor.

The pixel array 210 includes two-dimensionally arranged pixels including a plurality of rows and columns. The row decoder 220 selects one of the rows of the pixel array 210 in response to a row address signal output from the timing controller 240. The output circuit 230 outputs a photosensing signal from a plurality of pixels arranged along a selected row in a column-by-column unit. To do this, the output circuit 230 may include a column decoder and an analog-to-digital converter (ADC). For example, the output circuit 230 may include a plurality of ADCs respectively disposed for each column between the column decoder and the pixel array 210, or one ADC disposed at an output terminal of the column decoder. The timing controller 240, the row decoder 220, and the output circuit 230 may be implemented as one chip or as separate chips. The processor 250 of FIG. 1 for processing the image signal output from the output circuit 230 may be implemented as a single chip together with the timing controller 240, the row decoder 220, and the output circuit 230.

The pixel array 210 may include a plurality of pixels for sensing light having different wavelengths. The arrangement of pixels may be implemented in various ways.

Figure 3:
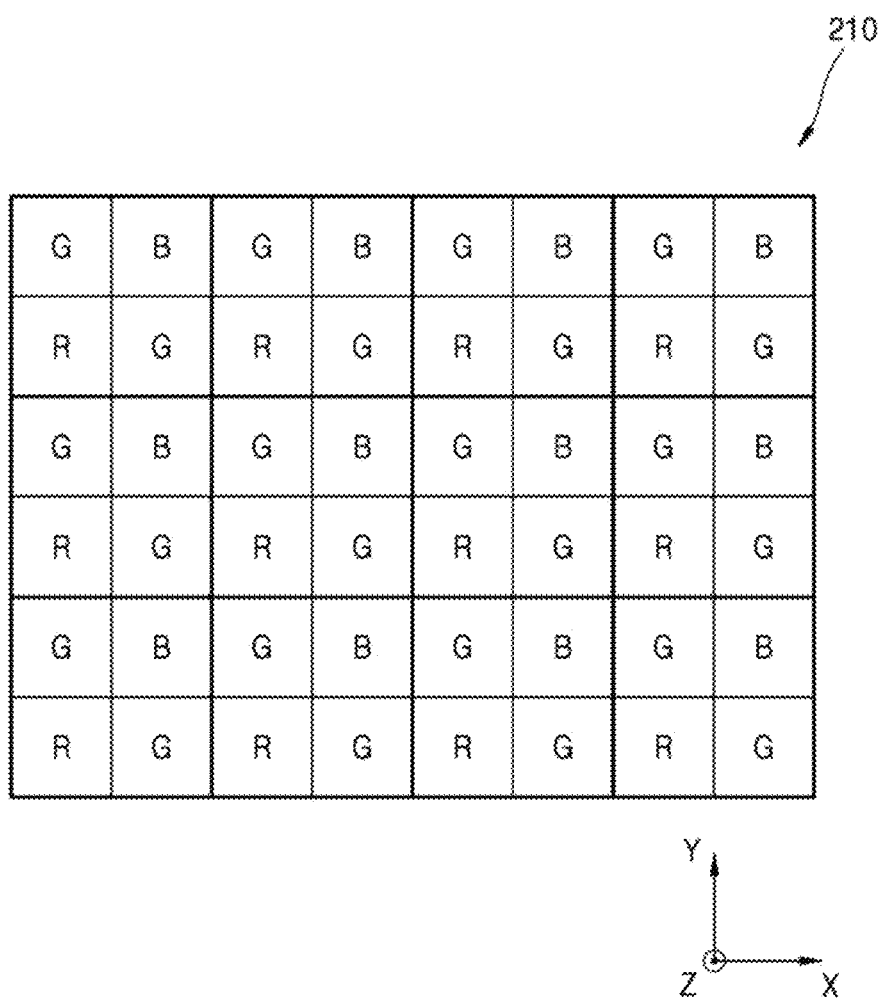
FIG. 3 is a diagram for explaining a Bayer pattern as a pixel arrangement of a pixel array of an image sensor.

FIG. 3 is a diagram for explaining a Bayer pattern as a pixel arrangement of a pixel array of an image sensor.

Referring to FIG. 3, one unit pixel may include four quadrant regions, and the first to fourth quadrants may include a blue pixel B, a green pixel G, a red pixel R, and a green pixel G, respectively. These unit pixels are two-dimensionally repeatedly arranged in the first direction (X direction) and the second direction (Y direction). In other words, two green pixels G are arranged in one diagonal direction in a unit pixel of a 2×2 array type, and one blue pixel B and one red pixel R are arranged in the other diagonal direction, respectively. Looking at the overall pixel arrangement, a first row in which the plurality of green pixels G and the plurality of blue pixels B are alternately arranged in the first direction and a second row in which the plurality of red pixels R and the plurality of green pixels G are alternately arranged in a first direction are repeatedly arranged in the second direction.

Figure 4:
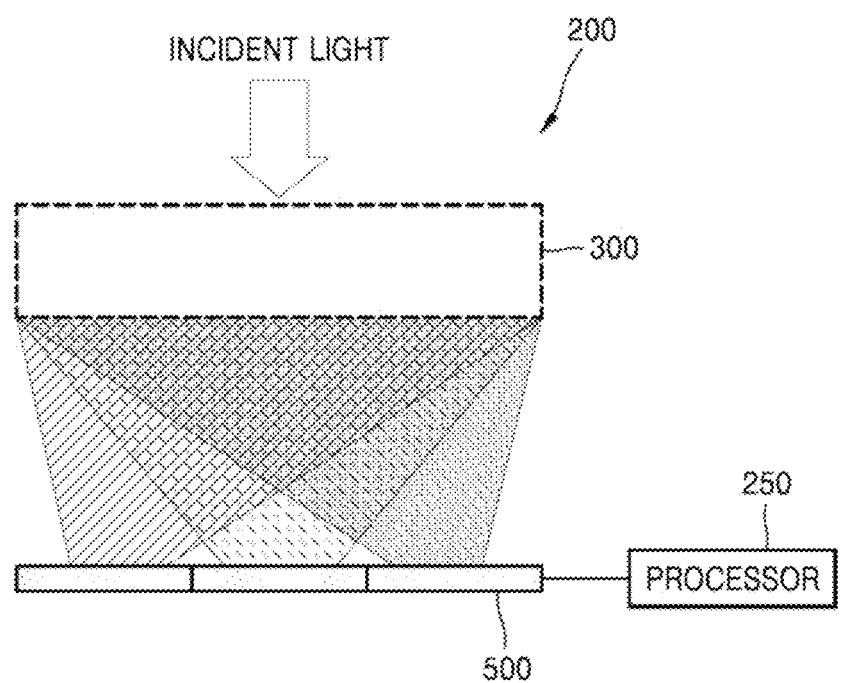
FIGS. 4 and 5 schematically show an image sensor according to an example embodiment.
Figure 5:
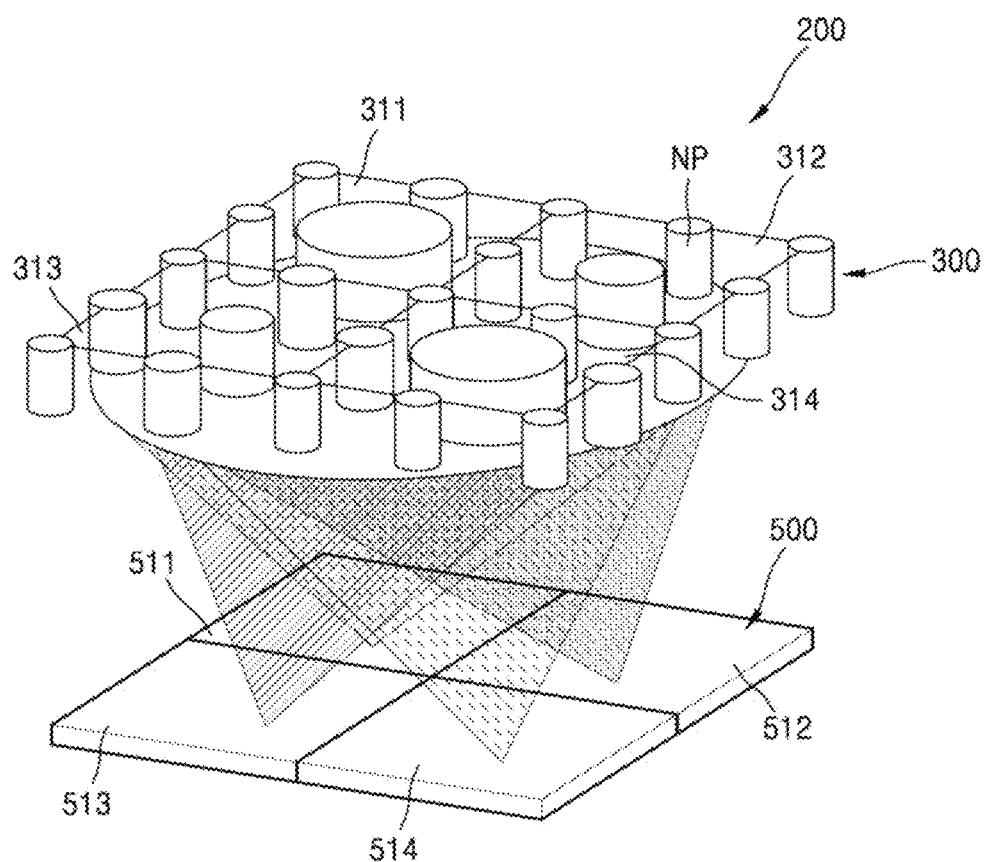
Figure 6:
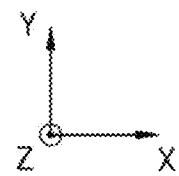
FIG. 6 is a plan view schematically illustrating an arrangement of photo-sensing cells in a pixel array of an image sensor.
Figure 7:
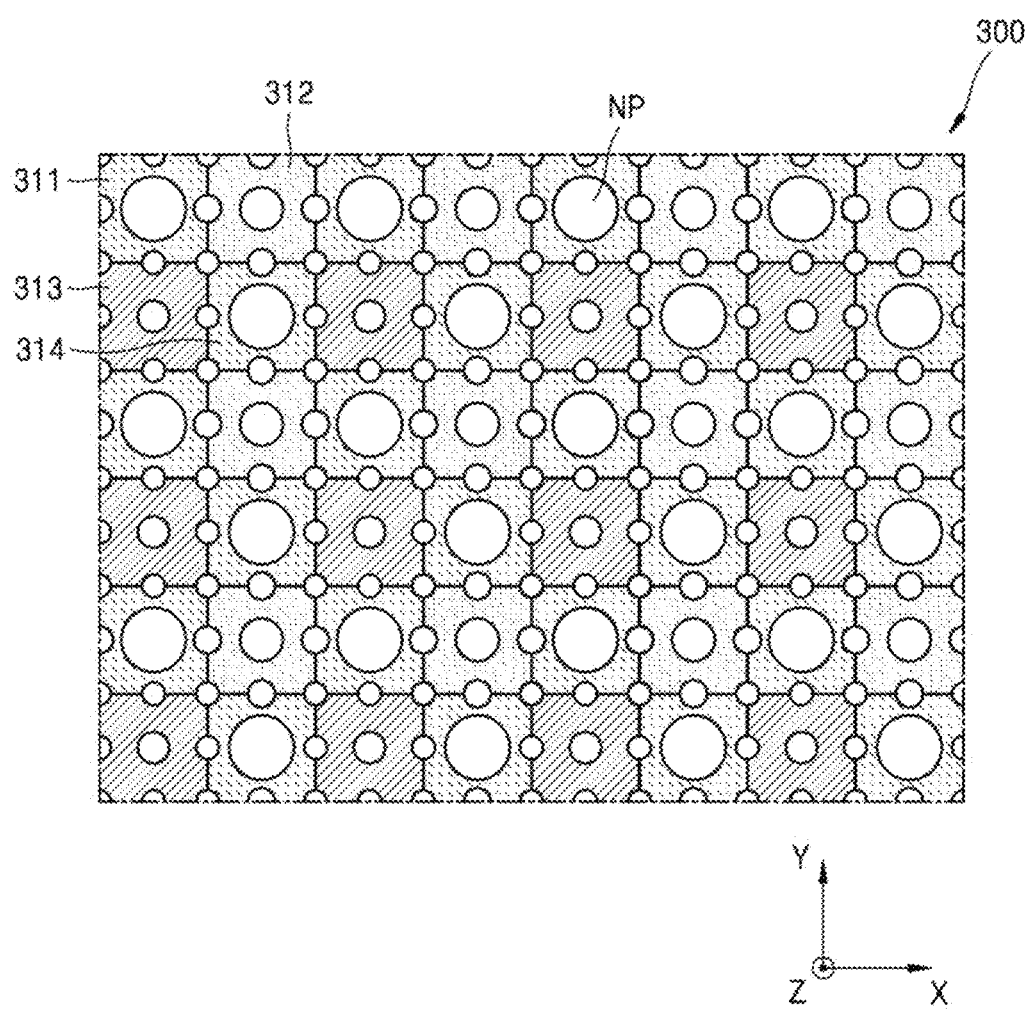
FIG. 7 is a plan view exemplarily showing a form in which a plurality of nanoposts are arranged in a plurality of regions of a color separation lens array to correspond to an arrangement of a photo-sensing cell of a sensor substrate of an image sensor.

FIGS. 4 and 5 schematically show an image sensor according to an example embodiment. FIG. 6 is a plan view schematically illustrating an arrangement of photo-sensing cells in a pixel array of an image sensor. FIG. 7 is a plan view exemplarily showing a form in which a plurality of nanoposts are arranged in a plurality of regions of a color separation lens array to correspond to an arrangement of a photo-sensing cell of a sensor substrate of an image sensor.

Referring to FIGS. 3 to 5, the pixel array 210 of the image sensor 200 includes a sensor substrate 500 including an array of a plurality of photo-sensing cells for sensing light and a color separation lens array 300 disposed on the front end of the sensor substrate 500 to separate light by color and to be incident on a plurality of photo-sensing cells.

The sensor substrate 500 of the image sensor 200 may include a first photo-sensing cell 511, a second photo-sensing cell 512, a third photo-sensing cell 513, and a fourth photo-sensing cell 514 that converts light into an electrical signal. Unit pixels of the first photo-sensing cell 511, the second photo-sensing cell 512, the third photo-sensing cell 513, and the fourth photo-sensing cell 514 may be repeatedly arranged in two dimensions. When the pixel array 210 of the image sensor 200 has a Bayer pattern, for example, the first photo-sensing cell 511 and the fourth photo-sensing cell 514 may correspond to the green pixel G, one of the second photo-sensing cell 512 and the third photo-sensing cell 513 may correspond to the red pixel R and the other may correspond to the blue pixel B.

The color separation lens array 300 has a nanostructure in each of a plurality of regions 311, 312, 313, and 314 facing each of the plurality of photo-sensing cells 511, 512, 513, and 514, to form a phase distribution for condensing light of different wavelengths to adjacent photo-sensing cells, so that incident light may be separated by color. As exemplarily shown in FIG. 5, the nanostructure of the color separation lens array 300 may include a plurality of nanoposts arranged such that one or more nanoposts (NP) are distributed to form a phase distribution for condensing light of different wavelengths to adjacent photo-sensing cells. As another example, the nanostructure of the color separation lens array 300 may be formed in a pattern to form a phase distribution for condensing light of different wavelengths to photo-sensing cells adjacent to each other. Hereinafter, a case in which the nanostructure is formed of nanoposts is described as an example.

The processor 250 processes the image signals for each color obtained from the image sensor 200 by performing decoupling on the sensing signals of the plurality of photo-sensing cells 511, 512, 513, and 514 of the sensor substrate 500 using a point spread function (PSF) corresponding to each color pixel by the color separation lens array 300 of the image sensor 200, and generates a color image from the processed image signals for each color.

The color separation lens array 300 may include a plurality of regions 311, 312, 313, and 314 facing the plurality of photo-sensing cells 511, 512, 513, and 514 of the sensor substrate 500 in one-to-one correspondence with each other. For example, the color separation lens array 300 may include first to fourth regions 311, 312, 313, 314 facing the first to fourth photo-sensing cells 511, 512, 513, and 514 of the sensor substrate 500 in one-to-one correspondence, and the first to fourth regions 311, 312, 313, and 314 may include first to fourth nanostructures to form a phase distribution for condensing light of different wavelengths to adjacent photo-sensing cells.

When the first to fourth nanostructures each have one or more nanoposts as in FIG. 5, the first region 311 may include one or more first nanoposts, the second region 312 may include one or more second nanoposts, the third region 313 may include one or more third nanoposts, and the fourth region 314 may include one or more fourth nanoposts. The shape, size, and arrangement of the first to fourth nanoposts to form a phase in which light of a predetermined wavelength that has passed through the color separation lens array 300 is condensed to the photo-sensing cell corresponding to any one of the first to fourth photo-sensing cells 511, 512, 513, and 514 and does not proceed to the other photo-sensing cells, may be determined In addition, each of the plurality of regions provided in the color separation lens array 300 may include a plurality of sub-regions, and the plurality of nanoposts may be disposed in the plurality of sub-regions. In addition, each of the plurality of regions provided in the color separation lens array 300 may include a plurality of sub-regions, and the plurality of nanoposts may be disposed at intersections between the plurality of sub-regions.

The image sensor 200 may have a pixel array structure in which unit pixels are repeatedly arranged. For example, the image sensor 200 may have a Bayer pattern structure in which unit pixels in which four quadrant regions each include a blue pixel, a green pixel, a red pixel, and a green pixel are two-dimensionally repeatedly arranged in a first direction and a second direction. In this case, for example, among the plurality of nanoposts of the color separation lens array 300, the nanoposts provided at the center of the region corresponding to the green pixel among the plurality of regions may have a larger cross-sectional region than the nanoposts provided at the center of the region corresponding to the pixel of a different color. In addition, among the plurality of nanoposts, the nanoposts provided in the region corresponding to the green pixel among the plurality of regions may have a smaller cross-sectional region than the nanoposts disposed at the center of the nanoposts disposed at the periphery. In addition, the nanoposts provided in the region corresponding to the green pixel among the plurality of regions may have different distribution rules in the first direction and the second direction, and the nanoposts provided in regions corresponding to the blue pixel and the red pixel among the plurality of regions may have a symmetrical distribution rule in the first direction and the second direction. As another example, the nanoposts provided at the center of the region corresponding to the blue pixel or the red pixel may have a larger cross-sectional area than the nanopost provided at the center of the region corresponding to the pixel of another color.

For example, the first photo-sensing cell 511 may sense light of a first wavelength corresponding to the first pixel, the second photo-sensing cell 512 may sense light of a second wavelength corresponding to the second pixel, the third photo-sensing cell 513 may sense light of a third wavelength corresponding to the third pixel, and the fourth photo-sensing cell 514 may sense light of a fourth wavelength corresponding to the fourth pixel. However, the embodiment is not limited thereto. Although not shown, a separator for cell separation may be further formed at the cell boundary.

In the image sensor 200, the first pixel, the second pixel, the third pixel, and the fourth pixel are a green pixel G, a blue pixel B, a red pixel R, and a green pixel G, respectively, and when the Bayer pattern arrangement is formed, the first photo-sensing cell 511, the second photo-sensing cell 512, the third photo-sensing cell 513, and the fourth photo-sensing cell 514 of the sensor substrate 500 may be disposed to correspond to the Bayer pattern arrangement.

The color separation lens array 300 separates incident light by color and makes it incident on a plurality of photo-sensing cells, for example, the first to fourth photo-sensing cells 511, 512, 513, and 514, and may include a plurality of nanopost (NP) arrays as shown in FIG. 5.

For example, the color separation lens array 300 may separate the incident light for each color so that the light of a first wavelength is incident on the first photo-sensing cell 511 to form a green pixel G, the light of a second wavelength is incident on the second photo-sensing cell 512 to form a blue pixel B, and the light of a third wavelength is incident on the third photo-sensing cell 513 to form a red pixel R, and the light of the first wavelength is incident on the fourth photo-sensing cell 514 to form the green pixel G.

The color separation lens array 300 includes a nanopost array in which a plurality of nanoposts NP are arranged in a predetermined order. The nanopost array may be supported by a spacer layer. The spacer layer serves to maintain a constant distance between the sensor substrate 500 and the color separation lens array 300. The spacer layer may be designed to be spaced as much as necessary to secure a focal length of the light passing through the color separation lens array 300 to each photo-sensing cell. Compared with the related art combination of a microlens array and a color filter, in the spacer layer in the case of using the color separation lens array, a thicker space is required between the sensor substrate 500 and the color separation lens array 300 to implement color separation and light collection. In addition, the spacer layer may be made of a material that is transparent to visible light. For example, the spacer layer may be made of a dielectric material having a lower refractive index than that of the nanoposts NP of the color separation lens array 300 such as $SiO_2$, siloxane-based spin on glass (SOG), or the like, and having a low absorption in the visible light band. In FIG. 5, the illustration of the spacer layer is omitted for convenience in order to more clearly express the separation depending on the color of the incident light in the color separation lens array 300.

Meanwhile, the color separation lens array 300 may further include a protective layer for protecting the plurality of nanoposts NP. The protective layer may be made of a dielectric material having a refractive index lower than that of the material constituting the nanoposts (NP). In addition, the color separation lens array 300 may further include a color filter between the spacer layer and the sensor substrate 500. For example, when the first pixel, the second pixel, the third pixel, and the fourth pixel are a green pixel G, a blue pixel B, a red pixel R, and a green pixel G, respectively, a green color filter may be disposed on the first photo-sensing cell 511 and the fourth photo-sensing cell 514 of the sensor substrate 500, a blue color filter may be disposed on the second photo-sensing cell 512, and a red color filter may be disposed on the third photo-sensing cell 513. A color filter may be used for various purposes, but when the color filter is used, for example, it may be easy to generate an image with respect to a signal of each wavelength band that has passed through the color filter by using the related art image signal processing technology.

The pixel array 210 of the image sensor 200 may have a two-dimensional arrangement. That is, as shown in FIG. 6, a plurality of first photo-sensing cells 511, second photo-sensing cells 512, the third photo-sensing cell 513, and the fourth photo-sensing cell 514 may be two-dimensionally arranged in a first direction (X direction) and a second direction (Y direction) on the sensor substrate so that a first row in which the first photo-sensing cell 511 and the second photo-sensing cell 512 are alternately arranged and a second rows in which the third photo-sensing cell 513 and the fourth photo-sensing cell 514 are alternately arranged are alternately repeated. In this case, when the pixel array 210 arrangement of the image sensor 200 is a Bayer pattern arrangement as shown in FIG. 3, the first photo-sensing cell 511 and the fourth photo-sensing cell 514 correspond to the green pixel G, the second photo-sensing cell 512 corresponds to the blue pixel B, and the third photo-sensing cell 513 corresponds to the red pixel R. As shown in FIG. 7, the nanopost array of the color separation lens array 300 may be divided into a plurality of regions 311, 312, 313, and 314 to correspond one-to-one to the arrangement of the first to fourth photo-sensing cells 511, 512, 513, and 514 of the sensor substrate 500.

For example, when the pixel arrangement of the image sensor 200 is a Bayer pattern arrangement, one unit pixel may include four quadrant regions, and the first to fourth quadrants may be the blue pixel B, the green pixel G, the red pixel R, and the green pixel G, respectively. These unit pixels are two-dimensionally repeatedly arranged in the first direction (X direction) and the second direction (Y direction).

In the unit pixel, the green pixel G corresponds to the first photo-sensing cell 511 and the first region 311 of the color separation lens array 300 corresponding thereto, the blue pixel B corresponds to the region 312 of the second photo-sensing cell 512 and the color separation lens array 300 corresponding thereto, the red pixel R corresponds to the region 313 of the third photo-sensing cell 513 and the color separation lens array 300 corresponding thereto, and the green pixel G corresponds to the fourth photo-sensing cell 514 and the fourth region 314 of the color separation lens array 300 corresponding thereto.

Referring to FIG. 7, the nanopost array of the color separation lens array 300 is partitioned into first to fourth regions 311, 312, 313, and 314 which face the first to fourth photo-sensing cells 511, 512, 513, and 514 in a one-to-one correspondence with each other. One or more nanoposts NP may be disposed in each of the first to fourth regions 311, 312, 313, and 314, and at least one of a shape, a size, and an arrangement of the nanoposts NP may vary depending on the region.

The shape, size, and arrangement of the plurality of nano-posts NP of the color separation lens array 300 may be determined to form a phase distribution for condensing light of different wavelengths to the first photo-sensing cell 511 and the second photo-sensing cell 512 adjacent to each other of the sensor substrate 500. In addition, the shape, size, and arrangement of the plurality of nano-posts NP of the color separation lens array 300 may be determined to form a phase distribution for condensing light of different wavelengths to the third photo-sensing cell 513 and the fourth photo-sensing cell 514 adjacent to each other of the sensor substrate 500.

For example, when the pixel array 210 of the image sensor 200 is a Bayer pattern arrangement, as shown in FIG.

7, because the region 311 of the color separation lens array 300 corresponds to the green pixel G, the region 312 of the color separation lens array 300 corresponds to the blue pixel B, the region 313 of the color separation lens array 300 corresponds to the red pixel R, and the region 314 of the color separation lens array 300 corresponds to the green pixel G, nanoposts NP having different cross-sectional areas are disposed in the center of the region of the color separation lens array 300 corresponding to the green pixel G, the blue pixel B, and the red pixel R, and the nanoposts NP are disposed at the intersection of the pixel boundary and the center on the boundary line between pixels. The cross-sectional area of the nanoposts NP disposed at the boundary between pixels may be less than that of the nanoposts NP disposed at the center of the pixel.

For example, the area of the cross-section of the nanoposts NP disposed in the center of the regions 311 and 314 of the color separation lens array 300 corresponding to the green pixel G is greater than the cross-sectional area of the nano-post NP disposed in the center of the region 312 of the color separation lens array 300 corresponding to the blue pixel B or the region 313 of the color separation lens array 300 corresponding to the red pixel R, and the cross-sectional area of the nano-posts NP disposed in the center of the region 312 corresponding to the blue pixel B is greater than that of the nano-posts NP disposed in the center of the region 313 corresponding to the red pixel R. However, the present invention is not limited thereto. Here, the cross-sectional area refers to the area of the cross-section perpendicular to the height direction (Z direction) of the nano-posts NP.

On the other hand, the nanoposts NP provided in the regions 311 and 314 corresponding to the green pixel G may have different distribution rules in the first direction (X-direction) and the second direction (Y-direction). That is, the nanoposts NP provided in the regions 311 and 314 corresponding to the green pixel G may have an asymmetric size arrangement in the first direction (X direction) and the second direction (Y direction). As shown in FIG. 7, the cross-sectional area of the nanopost NP positioned at a boundary between the regions 311 and 314 corresponding to the green pixel G and the region 312 corresponding to the blue pixel B adjacent in the first direction (X-direction) is different from the cross-sectional area of the nanopost NP positioned at a boundary between the regions 311 and 314 corresponding to the green pixel G and the region 313 corresponding to the red pixel R adjacent in the second direction (Y direction).

On the other hand, the nanoposts provided in the regions 312 and 313 corresponding to the blue pixel B and the red pixel R may have a symmetrical distribution rule in the first direction (X direction) and the second direction (Y direction). As shown in FIG. 7, in the region 312 corresponding to the blue pixel B, the cross-sectional area of the nanopost NP at the boundary with the region corresponding to the pixel adjacent thereto in the first direction (X-direction) is the same as the cross-sectional area of the nanopost NP at the boundary with the region corresponding to the pixel adjacent thereto in the second direction (Y direction). Also, in the region 313 corresponding to the red pixel B, the cross-sectional area of the nanopost NP at the boundary with the region corresponding to the pixel adjacent thereto in the first direction (X-direction) is the same as the cross-sectional area of the nanopost NP at the boundary with the region corresponding to the pixel adjacent thereto in the second direction (Y direction).

Such a distribution is due to the pixel arrangement of the Bayer pattern as follows. In the pixel arrangement of the Bayer pattern, in the case of the blue pixel (B) and the red pixel, pixels adjacent in the first direction (X direction) and the second direction (Y direction) are the same as the green pixel (G), and in the case of the green pixel G, the pixels adjacent in the first direction (X-direction) are the blue pixels (B) and the pixels adjacent in the second direction (Y-direction) are the red pixels (R), so the adjacent pixels are different from each other. Accordingly, in the second region 312 and the third region 313 respectively corresponding to the blue pixel B and the red pixel R, the nanoposts NP may be arranged in the form of 4-fold symmetry, and in the first and fourth regions 311 and 314 corresponding to the green pixel G, the nanoposts NP may be arranged in the form of 2-fold symmetry. In particular, the first region 311 and the fourth region 314 may be rotated 90 degrees with respect to each other.

In FIGS. 5 and 7, all of the plurality of nanoposts NP are illustrated as having a symmetrical circular cross-sectional shape, but the present invention is not limited thereto. Some nanoposts having an asymmetric cross-sectional shape may be included. For example, in the areas 311 and 314 corresponding to the green pixel G, nanoposts having an asymmetric cross-sectional shape in which the width in the first direction (X direction) is different from the width in the second direction (Y direction) may be employed. In the second region 312 and the third region 313 corresponding to the blue pixel (B) and the red pixel (R), respectively, nanoposts having a symmetrical cross-sectional shape in which the width in the first direction (X direction) is the same as the width in the second direction (Y direction) may be employed.

The exemplified arrangement rule of the nanopost array is an example for implementing a target phase distribution in which the light of the first wavelength is branched and condensed to the first photo-sensing cell 511 and the fourth photo-sensing cell 514, the light of the second wavelength is branched and condensed to the second photo-sensing cell 512, and the light of the third wavelength is branched and condensed in the third photo-sensing cell 513, and is not limited to the illustrated pattern.

The shape, size, and arrangement of the nanoposts NP respectively provided in the first to fourth regions 311, 312, 313, and 314 of the color separation lens array 300 may be determined so as to form a phase in which light of a first wavelength, for example, green G light, is condensed to the first photo-sensing cell 511 and the fourth photo-sensing cell 514 and does not travel to the second photo-sensing cell 512 and the third photo-sensing cell 513 adjacent to the first photo-sensing cell 511 and the fourth photo-sensing cell 514 at a position passing through the color separation lens array 300. The shape, size, and arrangement of the nanoposts NP respectively provided in the first to fourth regions 311, 312, 313, and 314 of the color separation lens array 300 may be determined so as to form a phase in which light of a second wavelength, for example, blue B light, is condensed to the second photo-sensing cell 512 and does not travel to the first photo-sensing cell 511, the third photo-sensing cell 513, and the fourth photo-sensing cell 514 adjacent to the second photo-sensing cell 512 at a position passing through the color separation lens array 300. In addition, the shape, size, and arrangement of the nanoposts NP respectively provided in the first to fourth regions 311, 312, 313, and 314 of the color separation lens array 300 may be determined so as to form a phase in which light of a second wavelength, for example, red R light, is condensed to the third photo-sensing cell 513 and does not travel to the first photo-sensing cell 511, the second photo-sensing cell 512, and the fourth photo-sensing cell 514 adjacent to the third photo-sensing cell 513 at a position passing through the color separation lens array 300.

The shape, size, and arrangement of the nanoposts NP that satisfy all of these conditions may be determined, and such a color separation lens array 300 may allow light immediately after passing therethrough to have the following target phase distribution. At a position immediately after passing through the color separation lens array 300, that is, on the lower surface of the color separation lens array 300 or the upper surface of the spacer layer, the target phase distribution to be implemented by the color separation lens array 300 may be a distribution in which the phase of the light of the first wavelength is $2n\pi$ in the central portions of the first region 311 and the fourth region 314 corresponding to the first photo-sensing cell 511 and the fourth photo-sensing cell 514 and is $(2n+1)\pi$ in the central portion of the second region 312 corresponding to the second photo-sensing cell 512 and the central portion of the third region 313 corresponding to the third sensing cell 513. Here, n is an integer.

In addition, in this target phase distribution, at a position immediately after passing through the color separation lens array 300, the phase of the light of the second wavelength may be $2n\pi$ at the center of the second region 312 corresponding to the second photo-sensing cell 512, may be $(2n-1)\pi$ at the center of the first region 311 corresponding to the first photo-sensing cell 511 and the center of the fourth region 314 corresponding to the fourth photo-sensing cell 514, and may be greater than $(2n-2)\pi$ and less than $(2n-1)\pi$ at the center of the third region 313 corresponding to the third photo-sensing cell 513. In other words, the phase of the light of the second wavelength at a position immediately after passing through the color separation lens array 300, is maximum at the center of the second region 312, gradually decreases in the form of concentric circles as the distance from the center of the second region 312 increases, is minimized in the center of the first region 311 and the center of the fourth region 314 in the X and Y directions, and is minimized at the center of the third region 313 in the diagonal direction. For example, when n=1, the phase of the light of the second wavelength at the position passing through the color separation lens array 300 may be $2\pi$ at the center of the second region 312, may be $\pi$ at the center of the first region 311 and the center of the fourth region 314, and may be about $0.2\pi$ to about $0.7\pi$ at the center of the third region 313.

In addition, in this target phase distribution, the phase of the light of the third wavelength at a position immediately after passing through the color separation lens array 300 may be $2n\pi$ at the central portion of the third region 312 corresponding to the third photo-sensing cell 513, may be $(2n-1)\pi$ at the central portion of the first region 311 corresponding to the first photo-sensing cell 511 and the central portion of the fourth region 314 corresponding to the fourth photo-sensing cell 514, and may be greater than $(2n-2)\pi$ and less than $(2n-1)\pi$ at the central portion of the second region 312 corresponding to the second photo-sensing cell 512. In other words, the phase of the light of the third wavelength at a position immediately after passing through the color separation lens array 300, is maximum at the center of the third region 313, gradually decreases in the form of concentric circles as the distance from the center of the second region 312 increases, is minimized in the center of the first region 311 and the center of the fourth region 314 in the X and Y directions, and is minimized at the center of the second region 312 in the diagonal direction. For example, when n=1, the phase of the light of the third wavelength at the position passing through the color separation lens array 300 may be $2\pi$ at the center of the third region 312, may be $\pi$ at the center of the first region 311 and the center of the fourth region 314, and may be about $0.2\pi$ to about $0.7\pi$ at the center of the second region 312.

This target phase distribution means a phase distribution at a position immediately after passing through the color separation lens array 300, that is, on the lower surface of the color separation lens array 300 or the upper surface of the spacer layer. When the light passing through the color separation lens array 300 has such a phase distribution, lights of the first to third wavelengths are collected in the first to fourth photo-sensing cells 511, 512, 513 and 514 of the corresponding sensor substrate 500, respectively. In other words, the light that has passed through the color separation lens array 300 is branched according to the wavelength and proceeds in different directions, thereby obtaining an effect of being condensed.

Figure 8A:
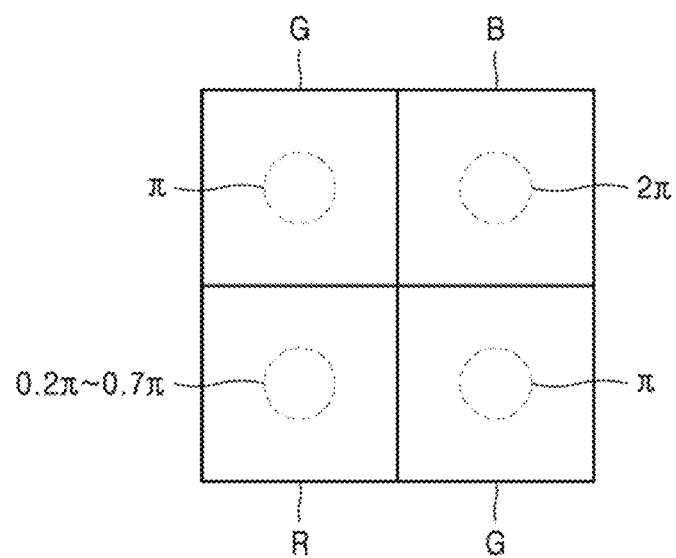
FIGS. 8A and 8B are diagrams showing a computational simulation of a phase distribution of blue light passing through a color separation lens array and a focusing distribution of blue light in the opposing photo-sensing cell.
Figure 8B:
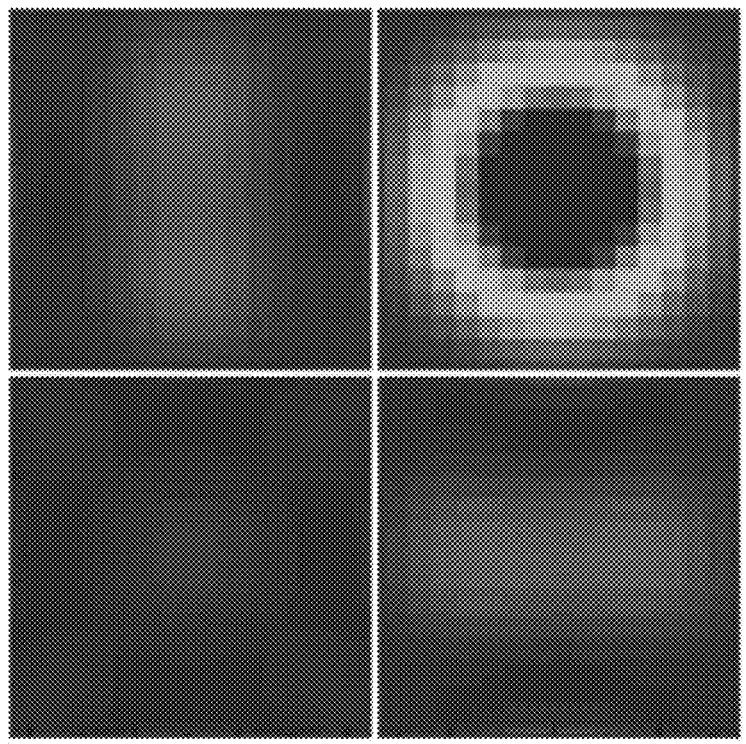
Figure 8C:
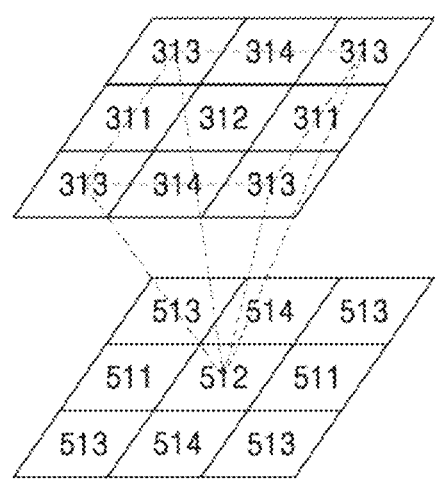
FIG. 8C shows an example of a propagation direction of a blue light incident to a second region of the color separation lens array corresponding to a blue pixel and the periphery thereof.
Figure 8D:
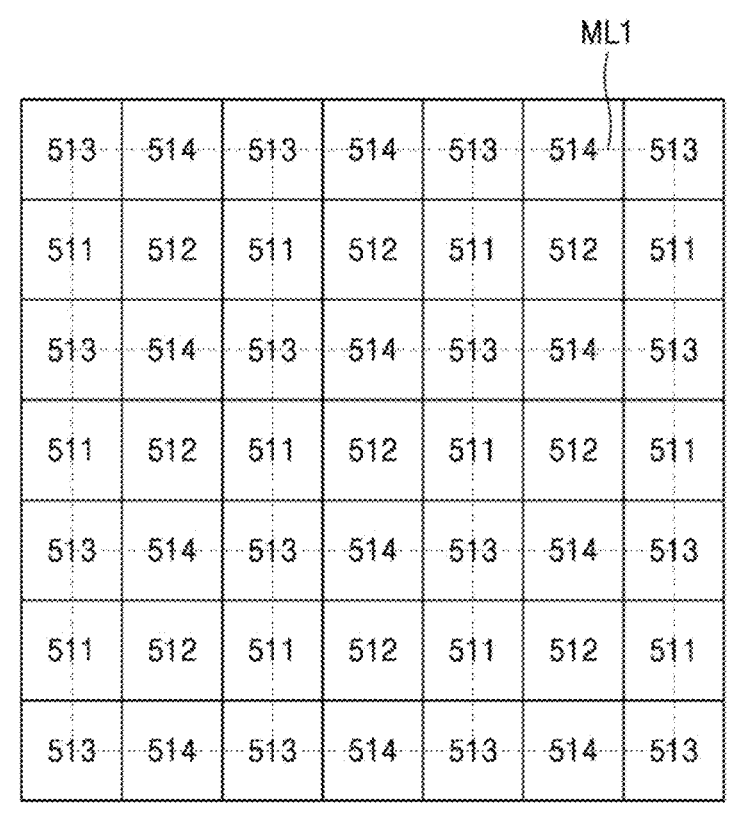

FIGS. 8A and 8B are diagrams showing a computational simulation of a phase distribution of blue light passing through a color separation lens array and a focusing distribution of blue light in the opposing photo-sensing cell, FIG. 8C shows an example of a propagation direction of a blue light incident to a second region of the color separation lens array corresponding to a blue pixel and the periphery thereof, and FIG. 8D shows an example of a micro lens array equivalent to the color separation lens array for blue light.

Looking at the phase distribution of blue light illustrated in FIG. 8A, the phase at the center of the region corresponding to the blue pixel B is $2\pi$, the phase at the center of the region corresponding to the adjacent green pixel G may approximately represent a value of $\pi$, and the phase at the center of the region corresponding to the red pixel R in the diagonal direction may approximately represent a value less than $\pi$ (e.g., about $0.2\pi$ to about $0.7\pi$). Such a phase distribution may represent a focusing distribution of blue light as shown in FIG. 8B. Due to this phase distribution, most of the blue light is focused on the second photo-sensing cell 512 of the sensor substrate 500 corresponding to the blue pixel B, and the blue light hardly reaches the first, third, and fourth photo-sensing cells 511, 513, and 514 corresponding to other pixels.

As a result, the blue light incident on the second region 312 corresponding to the blue pixel B and around the second region 312 passes through the color separation lens array 300 and then proceeds as shown in FIG. 8C. For example, among the incident light incident to the second region 312 of the color separation lens array 300 and some of the other regions surrounding the second region 312, blue light is the second photo-sensing cell 512. In other words, in one blue pixel B, blue light coming from the second region 312 corresponding to the blue pixel B, blue light coming from two first regions 311 horizontally adjacent to the second region 312, blue light coming from two fourth regions 314 vertically adjacent to the second region 312, and blue light coming from four third regions 313 diagonally adjacent to the second region 312 are incident.

Accordingly, as shown in FIG. 8D, the color separation lens array 300 may play an equivalent role to the array of a plurality of micro lenses ML1 indicated by dashed lines centered on the second photo-sensing cell 512 for blue light. Because each equivalent micro lens ML1 is larger than the corresponding second photo-sensing cell 512, in addition to the blue light incident on the region of the second photo-sensing cell 512, the blue light incident on another regions surrounding the second photo-sensing cell 512 may also be focused on the second photo-sensing cell 512. For example, each micro lens ML1 is about 4 times larger than the corresponding second photo-sensing cell 512, and four sides of each micro lens ML1 may be parallel to four sides of the second photo-sensing cell 512.

Figure 9A:
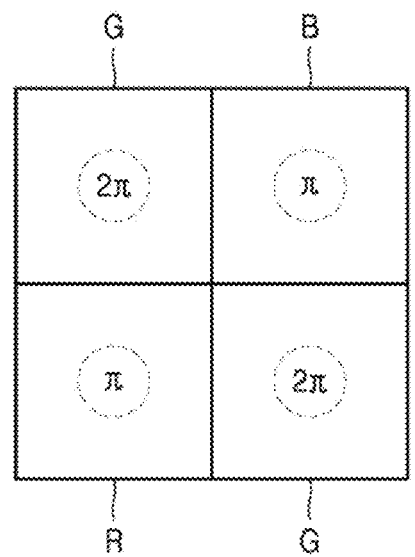
FIGS. 9A and 9B are diagrams showing a computational simulation of a phase distribution of green light passing through a color separation lens array and a focusing distribution of green light in the opposing photo-sensing cell.
Figure 9B:
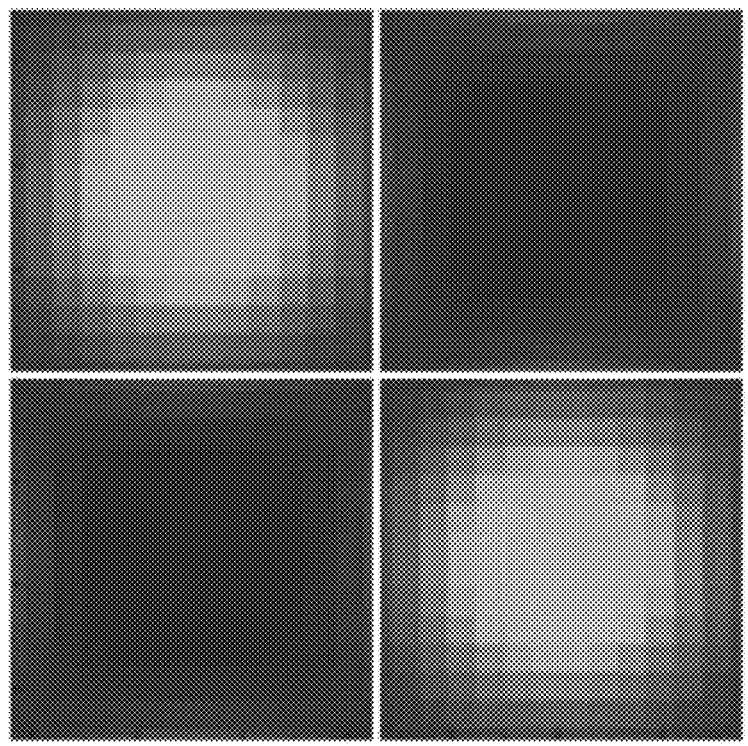
Figure 9C:
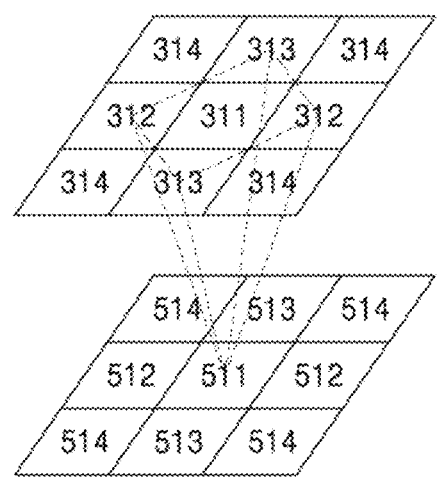
FIG. 9C shows an example of a propagation direction of the green light incident to a first region of the color separation lens array corresponding to a green pixel and the periphery thereof.
Figure 9D:
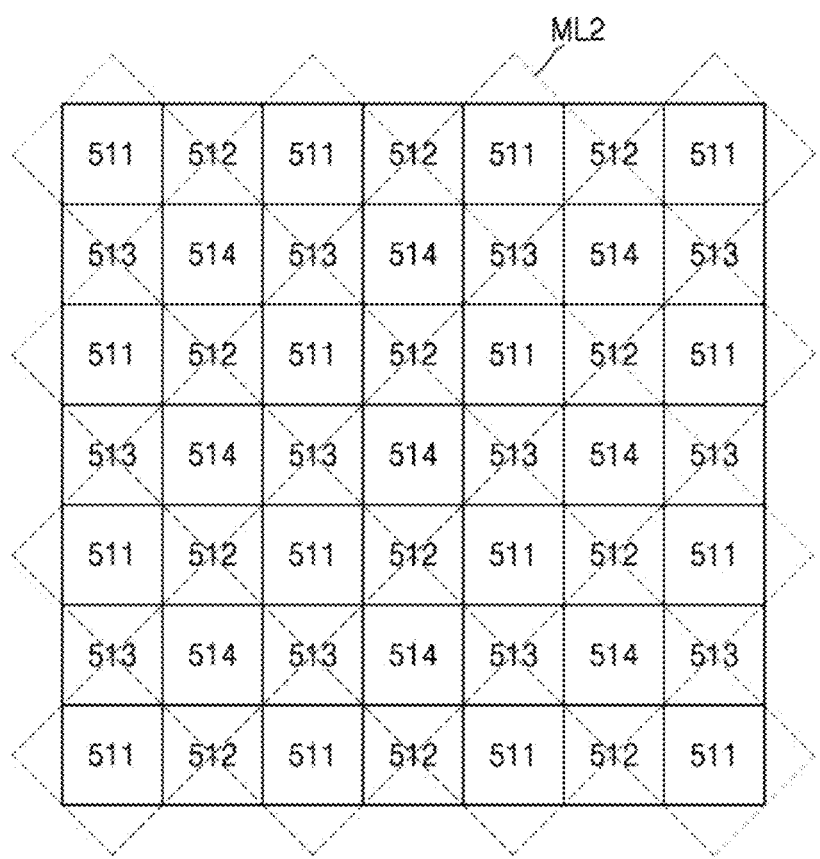
FIG. 9D shows an example of a micro lens array equivalent to the color separation lens array for green light.

FIGS. 9A and 9B are diagrams showing a computational simulation of a phase distribution of green light passing through a color separation lens array and a focusing distribution of green light in the opposing photo-sensing cell, FIG. 9C shows an example of a propagation direction of the green light incident to a first region of the color separation lens array corresponding to a green pixel and the periphery thereof, and FIG. 9D shows an example of a micro lens array equivalent to the color separation lens array for green light.

In the phase distribution of green light illustrated in FIG. 9A, the phase at the center of the area corresponding to the green pixel G may represent a value of approximately $2\pi$, and the phase at the center of the region corresponding to the adjacent blue pixel B and the red pixel R may represent a value of approximately $\pi$. Such a phase distribution may represent a focusing distribution of green light as shown in FIG. 9B. By this phase distribution, the green light is divided and focused on the two first photo-sensing cells 511 and 514 of the sensor substrate 500 corresponding to the two green pixels and hardly reaches the second and third photo-sensing cells 512 and 513 corresponding to other pixels.

As a result, green light incident on the first and fourth regions 311 and 314 corresponding to the green pixel G and the periphery of the first and fourth regions passes through the color separation lens array 300 and then proceed as shown in FIG. 9C. For example, among the incident light incident on the first region 311 of the color separation lens array 300 and some of the other regions surrounding the first region 311, the green light is focused on the first photo-sensing cell 511 directly under the first region 311. In other words, green light coming from the first region 311 or the fourth area 314 corresponding to the green pixel G and green light coming from two second regions 312 and two third regions 313 adjacent to the first region 311 or the fourth region 314 in the horizontal and vertical directions are incident on one green pixel G.

Accordingly, as shown in FIG. 9D, the color separation lens array 300 may play an equivalent role to the array of a plurality of micro lenses ML2 indicated by dashed lines centered on the first photo-sensing cell 511 and the fourth photo-sensing cell 514 for green light. Because each equivalent micro lens ML2 is larger than the corresponding first photo-sensing cell 511 or fourth photo-sensing cell 514, in addition to the green light incident on the regions of the first photo-sensing cell 511 and the fourth photo-sensing cell 514, the green light incident on another region surrounding the first photo-sensing cell 511 and the fourth photo-sensing cell 514 may also be focused on the first photo-sensing cell 511 and the fourth photo-sensing cell 514. For example, each micro lens ML2 is about twice as large as the corresponding first photo-sensing cell 511 or fourth photo-sensing cell 514, and the first photo-sensing cell 511 and the fourth photo-sensing cell 514 may be disposed to be in contact with each other in a diagonal direction.

Figure 10A:
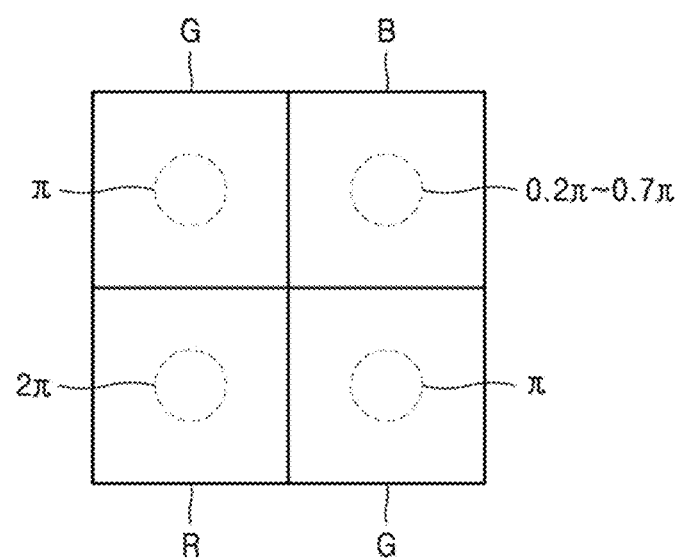
FIGS. 10A and 10B are diagrams showing a computational simulation of a phase distribution of red light passing through a color separation lens array and a focusing distribution of red light in the opposing photo-sensing cell.
Figure 10B:
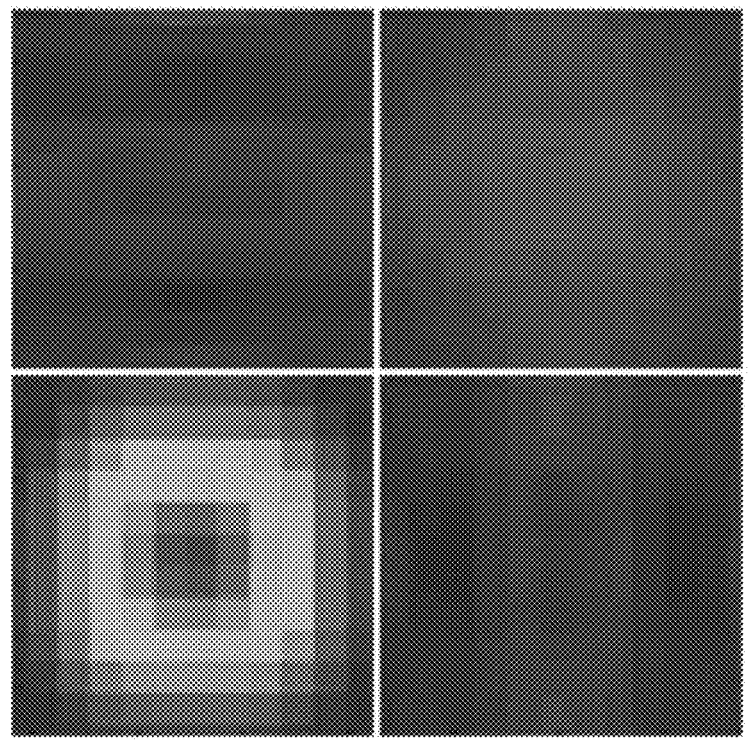
Figure 10C:
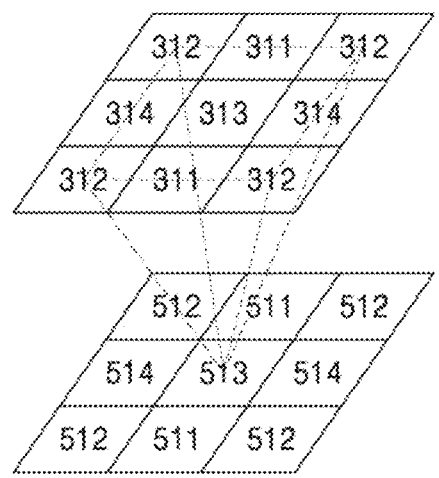
FIG. 10C shows an example of a propagation direction of the red light incident to a third region of the color separation lens array corresponding to a red pixel and the periphery thereof.
Figure 10D:
FIG. 10D shows an example of a micro lens array equivalent to the color separation lens array for red light.

FIGS. 10A and 10B are diagrams showing a computational simulation of a phase distribution of red light passing through a color separation lens array and a focusing distribution of red light in the opposing photo-sensing cell, FIG. 10C shows an example of a propagation direction of the red light incident to a third region of the color separation lens array corresponding to a red pixel and the periphery thereof, and FIG. 10D shows an example of a micro lens array equivalent to the color separation lens array for red light.

Looking at the phase distribution of red light illustrated in FIG. 10, the phase at the center of the region corresponding to the red pixel R is $2\pi$, the phase at the center of the region corresponding to the adjacent green pixel G may approximately represent a value of $\pi$, and the phase at the center of the region corresponding to the blue pixel R in the diagonal direction may approximately represent a value less than $\pi$ (e.g., about $0.2\pi$ to about $0.7\pi$). Such a phase distribution may represent a focusing distribution of red light as shown in FIG. 10B. Due to this phase distribution, most of the red light is focused on the third photo-sensing cell of the sensor substrate corresponding to the red pixel R, and the red light hardly reaches the first, second, and fourth photo-sensing cells corresponding to other pixels.

As a result, the light incident on the third region 133 corresponding to the red pixel R and around the third region 133 passes through the color separation lens array 130 and then proceeds as shown in FIG. 10C. For example, among the incident light incident on the third region 133 of the color separation lens array 130 and some of the other regions surrounding the third region 133, the red light is focused on the third photo-sensing cell 113 directly under the third region 133. In other words, in one red pixel R, red light coming from the third region 133 corresponding to the red pixel R, red light coming from two fourth regions 134 horizontally adjacent to the third region 133, red light coming from two first regions 131 vertically adjacent to the third region 133, and red light coming from four second regions 132 diagonally adjacent to the third region 133 are incident.

Therefore, as shown in FIG. 10D, the color separation lens array 300 may serve as an equivalent to the array of a plurality of micro lenses ML3 indicated by a dashed line centered on the third photo-sensing cell 513 for red light. Because each equivalent micro lens ML3 is larger than the corresponding third photo-sensing cell 513, in addition to the red light incident on the region of the third photo-sensing cell 513, the red light incident on other region surrounding the third photo-sensing cell 513 may also be focused on the third photo-sensing cell 513. For example, each micro lens ML3 is about 4 times larger than the corresponding third photo-sensing cell 513, and four sides of each micro lens ML3 may be parallel to four sides of the third photo-sensing cell 513.

Because the above-described color separation lens array 300 branches incident light for each wavelength without absorbing or blocking the incident light, and condenses the branched light on a specific region, the light use efficiency of the image sensor may be improved.

However, by using the color separation lens array 300, the sensitivity was improved compared to the image sensor using only the Bayer pattern, but when image processing is performed using the related art image processing processor as it is, a problem in which image quality is deteriorated may occur. In particular, due to crosstalk of an image sensor having a color separation lens array, a problem in which spatial resolution and spectral resolution are lowered may occur. For example, blur, grid artifacts, and color mixing may occur in the output image. Accordingly, there is a need to develop an image acquisition apparatus and method capable of solving the above-mentioned problems while taking advantage of the sensitivity gain of the color separation lens array.

Figure 11:
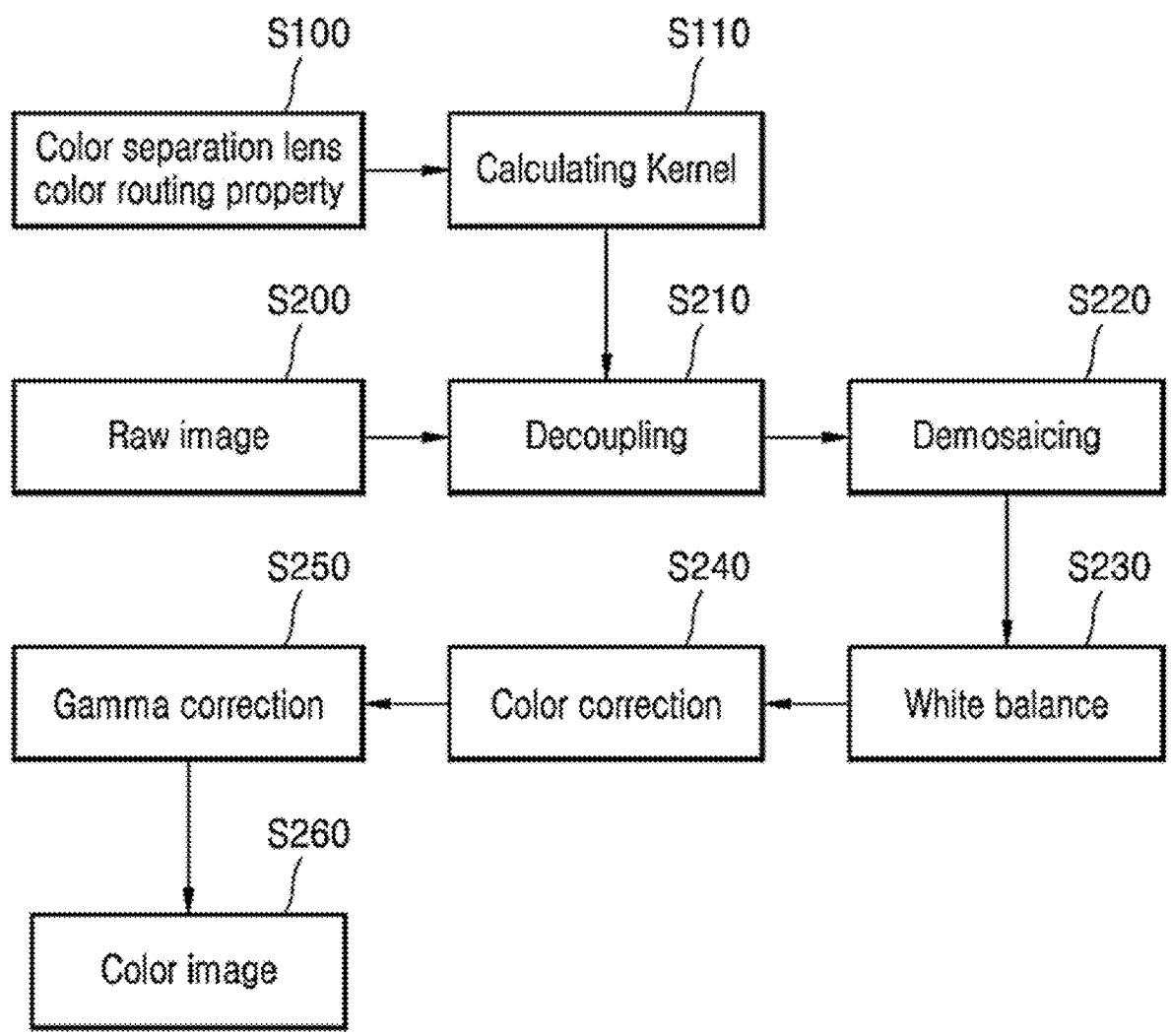
FIG. 11 is a block diagram illustrating a process of processing an image signal for each color obtained by an image sensor of an image acquisition apparatus according to an example embodiment.
Figure 12A:
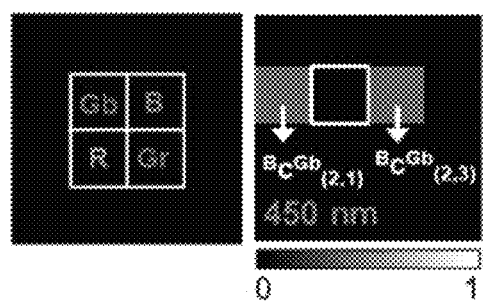
FIGS. 12A and 12B are diagrams for explaining a point spread function of an image sensor having a color separation lens array and a Bayer pattern arrangement.
Figure 12B:
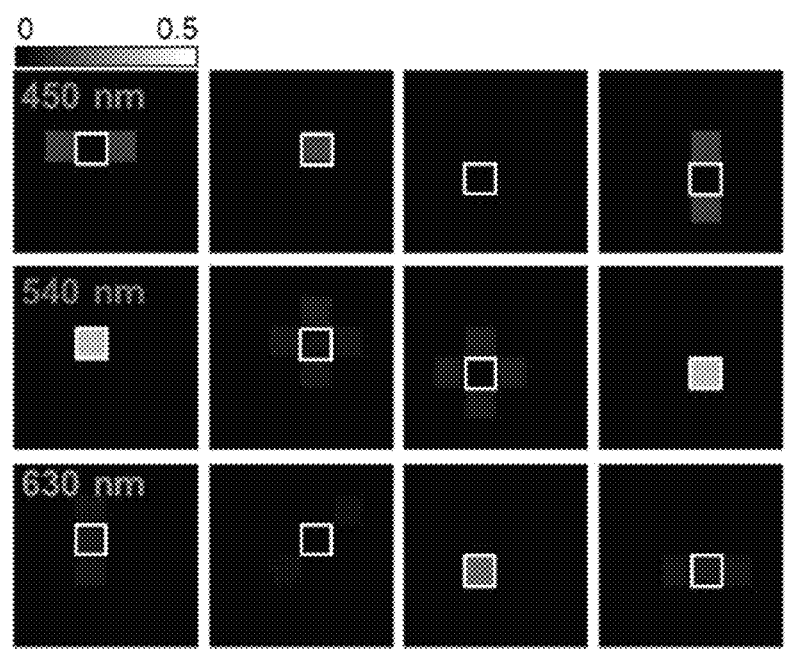

FIG. 11 is a block diagram illustrating a process of processing an image signal for each color obtained by an image sensor of an image acquisition apparatus according to an example embodiment. FIGS. 12A and 12B are diagrams for explaining a point spread function of an image sensor having a color separation lens array and a Bayer pattern arrangement.

Referring to FIGS. 1 to 11, the processor 250 of the image acquisition apparatus 100 according to an example embodiment may receive sensing signals (or raw images) of the plurality of photo-sensing cells (operation S200) and color routing characteristics of the color separation lens array 300 from the image sensor 200 (operation S100). For example, the color routing characteristic of the color separation lens array 300 may be a phase distribution of each of red, green, and blue light passing through the color separation lens array 300 described above with reference to FIGS. 8A to 8C, 9A-9C and 10A to 10C.

According to an example embodiment, in operation S110, the processor 250 may calculate a kernel by using a point spread function estimated by the color routing characteristic of the color separation lens array 300, and in operation S210, the processor may use the calculated kernel when decoupling the raw image.

The point spread function of the color separation lens array 300 represents a way in which light is transmitted from an incident region to a photo-sensing cell for light of the RGB representative wavelength, and may be obtained through optical simulation using a finite difference time domain (hereinafter, FDTD) method.

The point spread function of the color separation lens array 300 may be estimated by the color routing characteristic of the color separation lens array 300. For example, the point spread function of the color separation lens array 300 may be estimated based on the respective phase distributions of red, green, and blue light passing through the color separation lens array 300.

Referring to the FIG. 6 and the left image in FIG. 12A, a unit pixel of the image sensor 200 having a Bayer pattern arrangement may include four color pixels B, Gb, R, and Gr in a 2×2 arrangement. The unit pixels may be repeatedly arranged in a horizontal direction and a vertical direction.

Referring to FIGS. 5, 12A, and 12B, FIG. 12B shows a plurality of drawings in three rows and four columns. A plurality of drawings show point spread functions (PSFs) of the image sensor 200 (or image system) obtained as a result of performing optical simulation using the FDTD method.

Referring to the three drawings arranged in column 1 of FIG. 12B, because the image sensor 200 includes the color separation lens array 300, red light and blue light incident to the color pixel Gb may not be absorbed and may be branched into neighboring pixels. For example, when blue light is incident on the color pixel Gb, it may be branched into two color pixels B disposed on the left and right. When the green light is incident on the color pixel Gb, it may be transmitted to the vertically arranged photo-sensing cell. When red light is incident on the color pixel Gb, it may be branched into two color pixels R arranged above and below.

In addition, referring to the three figures arranged in column 2 of FIG. 12B, the red light and green light incident to the color pixel B may not be absorbed and may be branched into neighboring pixels. For example, when the blue light is incident on the color pixel B, it may be transmitted to the vertically arranged photo-sensing cell. When green light is incident on the color pixel B, it may be branched into four color pixels Gb and Gr disposed at upper and lower sides and left and right. When red light is incident on the color pixel B, it may be branched into four color pixels R arranged in a diagonal direction.

In addition, referring to the three figures arranged in column 3 of FIG. 12B, the blue light and green light incident to the color pixel R may not be absorbed and may be branched into neighboring pixels. For example, when blue light is incident on the color pixel R, it may be branched into four color pixels B arranged in a diagonal direction. When the green light is incident on the color pixel R, it may be branched into four color pixels Gb and Gr disposed at upper and lower sides and left and right. When the red light is incident on the color pixel R, it may be directly transmitted to the vertically arranged photo-sensing cell.

Similarly, referring to the three figures arranged in column 4 of FIG. 12B, red light and blue light incident on the color pixel Gr may not be absorbed and may be branched into neighboring pixels. For example, when blue light is incident on the color pixel Gr, it may be branched into two color pixels B disposed above and below. When the green light is incident on the color pixel Gr, it may be directly transmitted to the vertically arranged photo-sensing cell. In addition, when red light is incident on the color pixel Gr, it may be branched into two color pixels R disposed on the left and right.

Referring back to the right drawing of FIG. 12A, as a view corresponding to the drawing shown in row 1, column 1 of FIG. 12B, when the blue light is incident on the color pixel Gb, the ratio of the light that is branched into the two color pixels B disposed on the left and right may be expressed as a color separation coefficient. ${}^B c^{Gb}_{(2,1)}$ is a color separation coefficient, and represents the ratio of light that is branched to the photo-sensing cells of 2 rows and 1 column (i.e., the left color pixel B) when B color light is incident on the Gb color pixel, and ${}^B C^{Gb}_{(2,3)}$ is a color separation coefficient, and represents the ratio of light that is branched to the photo-sensing cells of 2 rows and 3 columns (i.e., the right color pixel B) when B color light is incident on the Gb color pixel.

The point spread function includes (k)×(m) parameters of m outputs for k inputs, and the kernel may be expressed as a linear combination of the parameters. For example, the unit pixel of the image sensor 200 having the Bayer pattern arrangement includes four color pixels B, Gb, R, and Gr in a 2×2 array, and red, green, and blue light is incident on each of the color pixels B, Gb, R, and Gr, so k is 12. In addition, the branched light is output to four color pixels B, Gb, R, and Gr, so m is 4. Thus, the point spread function may consist of 48 parameters. However, because the kernel excludes a case having a value of 0 among 48 parameters, fewer than 48 parameters may be included.

In addition, because the kernel has a fixed value as long as the structure of the color separation lens array 300 does not change, it may be configured in a lookup table format and may be stored in the image acquisition device 100.

In operation S220, S230, S240, and S250, the processor 250 may perform the process of reconstructing the raw image (or the input image). The process of reconstructing the raw image may include demosaicing (operation S220), white balance (operation S230), color correction (operation S240), and gamma correction (operation S250), for example. In operation S260, the processor 250 may generate a color image (or an output image) by performing a process of reconstructing the input image based on the decoupled sensing input signal using the kernel.

In operation S220, the processor 250 may perform demosaicing based on the decoupled sensing signal. The demosaicing is an image processing technique that generates an image frame by performing color interpolation on a Bayer raw image. The demosaicing algorithm may apply various methods. For example, the various methods include a bilinear interpolation method, an approach using correlation between channels, and a method for increasing spatial resolution using edge directionality.

For example, in demosaicing using the bilinear interpolation method, referring to the two-dimensional arrangement of the four pixels B, Gb, R, and Gr constituting the Bayer unit pixel as in FIG. 12A, in the case of a color pixel B, the blue value is B, the green value is an average of the color values of four surrounding green pixels, and the red value may be interpolated using the average of the color values of the four surrounding red pixels. In the case of a color pixel Gb, the green value is Gb, the blue value is an average of the color values of two adjacent blue pixels, and the red value may be interpolated using the average of the color values of two adjacent red pixels. In the case of the color pixel R, the red value is R, the green value is the average of the color values of four surrounding green pixels, and the blue value may be interpolated using the average of the color values of the four surrounding blue pixels. In the case of the color pixel Gr, the green value is Gr, the blue value is the average of the color values of two surrounding blue pixels, and the red value may be interpolated using an average of the color values of two adjacent red pixels.

In operation S230, the processor 250 may perform white balance after demosaicing. White balance is an image processing technology that adjusts a white object that looks different from the original color to appear white depending on a light source such as sunlight, fluorescent lamp, or incandescent lamp. Humans are adaptable to colors, so even if lighting and places are changed, they do not feel the difference in color on objects well. However, because the image sensor 200 does not conform to color, a difference in color of an object may appear depending on lighting and a location. Therefore, the image sensor 200 needs to perform white balance in order to control the color change according to the light source. The white balance algorithm may apply various well-known methods.

In operation S240, after white balance, the processor 250 may perform color correction to solve spectral resolution degradation due to color degradation. When an image frame is generated by performing color interpolation on a Bayer raw image, distortion may occur in expressing color, and color correction refers to image processing to correct such distortion. The color correction algorithm may apply various known methods.

In operation S250, the processor 250 may perform gamma correction after color correction. Gamma correction refers to image processing for nonlinearly transforming a light intensity signal by using a nonlinear transfer function on an image. The gamma correction algorithm may apply various known methods.

According to an example embodiment, the processor 250 may perform the operations in the order illustrated in FIG. 11. However, the disclosure is not limited thereto, and as such, one or more operations illustrated in FIG. 1 may be performed in a different order. Moreover, according to an example embodiment, two or more operations illustrated in FIG. 1 may be performed simultaneously or in a sequential order.

Hereinafter, a process of calculating a kernel and a process of performing decoupling using the kernel are described in detail with reference to FIGS. 13 to 17C.

Figure 13:
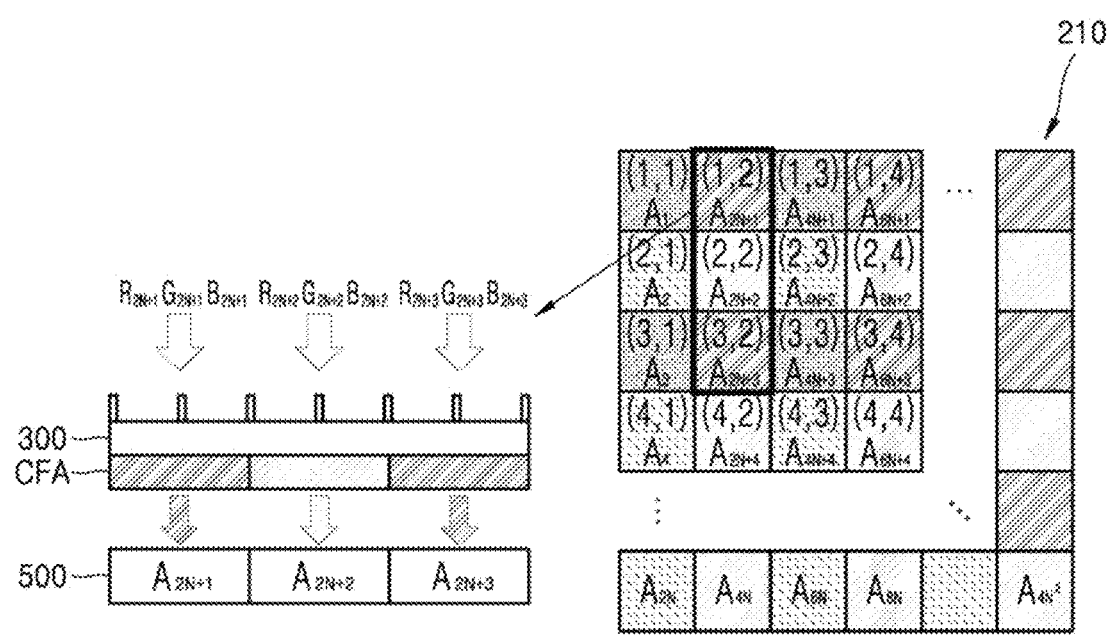
FIG. 13 is a cross-sectional view and a plan view of a pixel array of an image sensor having a color separation lens array and having a Bayer pattern arrangement.

FIG. 13 is a cross-sectional view and a plan view of a pixel array of an image sensor having a color separation lens array and having a Bayer pattern arrangement. In this case, the pixels (1,2), (1,4), (3,2), and (3,4) are red pixels, and the pixels (2,1), (2,3), (4,1), and (4,3) are blue pixels, pixels (1,1), (1,3), (3,1), and (3,3) are green pixels GR, and pixels (2,2), (2,4), (4,2), (4,4) are green pixels GB. The same hatching refers to the same color.

Referring to the right plan view of FIG. 13, the pixel array 210 having a Bayer pattern according to an example embodiment may include a plurality of unit pixels. One unit pixel may include four quadrant regions, and the first to fourth quadrants may be a red pixel R, a green pixel G, a blue pixel B, and a green pixel G, respectively. These unit pixels are two-dimensionally repeatedly arranged in the first direction (X direction) and the second direction (Y direction).

Two green pixels G are arranged in one diagonal direction, and one red pixel R and one blue pixel B are arranged in the other diagonal direction in the unit pixel of the 2×2 array type. Looking at the overall pixel arrangement, a first row in which a plurality of green pixels G and a plurality of red pixels R are alternately arranged in a first direction and a second row in which a plurality of blue pixels B and a plurality of green pixels G are alternately arranged in the first direction are repeatedly arranged in the second direction.

Referring to the left cross-sectional view of FIG. 13, the (2N+1)th photo-sensing cell and the (2N+3)th photo-sensing cell of the sensor substrate 500 correspond to the color pixel R, and the (2N+2)th photo-sensing cell corresponds to a color pixel Gb. In this case, the pixel array 210 may include a color filter array CFA corresponding to each color pixel between the color separation lens array 300 and the sensor substrate 500.

The color separation lens array 300 may condense the light component from a neighboring pixel to the predetermined pixel in addition to the light component corresponding to the predetermined pixel. In detail, the red light incident on the (2N+1)th photo-sensing cell may include light $R_{2N+2}$ branched from an adjacent peripheral color separation lens (facing the color pixel Gb) and light $R_{2N+3}$ branched from the adjacent peripheral color separation lens (facing the color pixel R) as well as light $R_{2N+1}$ passing through the color separation lens facing the color pixel R. In addition, the green light incident on the (2N+2)th photo-sensing cell may include light $R_{2N+1}$ branched from an adjacent peripheral color separation lens (facing the color pixel R) and light $R_{2N+3}$ branched from the adjacent peripheral color separation lens (facing the color pixel R) as well as light $R_{2N+2}$ passing through the color separation lens facing the color pixel Gb. Similarly, the red light incident on the (2N+3)th photo-sensing cell may include light $R_{2N+1}$ branched from an adjacent peripheral color separation lens (facing the color pixel R) and light $R_{2N+2}$ branched from the adjacent peripheral color separation lens (facing the color pixel Gb) as well as light $R_{2N+3}$ passing through the color separation lens facing the color pixel R perpendicularly.

That is, the decoupling with respect to the red component for each of the plurality of pixels may be performed in consideration of a red component passing through one red pixel among the plurality of pixels and a red component passing through a plurality of surrounding pixels (example: 8 surrounding pixels surrounding one pixel in Bayer pattern array) in contact with the red pixel. For example, the red component of the pixel (3,2) shown in FIG. 13 may be determined in consideration of signals incident to eight pixels surrounding the pixel (3,2) in addition to the signal measured in the pixel (3,2). For example, ½ of signals of each of the four green pixels (2,2), (3,1), (3,3), and (4,2), and ¼ of the signals of each of the four blue pixels (2,1), (2,3), (4,1), and (4,3) may be considered as a red component.

An algorithm for restoring the R/G/B signals $R_n$, $G_n$, and $B_n$ of each color pixel from the signal $A_n$ recorded by the sensor substrate 500 (or the photo-sensing cell) of the image sensor (200 in FIG. 5) may be described as a linear equation using the point spread function of the color separation lens array 300. Although the equation describing the algorithm is an indefinite equation in which the number of unknowns is greater than the number of equations, it may be substituted with a linear equation that may be solved by using interpolation approximation, the linear equation for the R-Channel may be expressed as Equation 1 below.

$$A1_n = {}^Rc^B_{(3,4)} \cdot R_{n-4N-2}/4 + [{}^Rc^B_{(1,4)} + {}^Rc^B_{(3,4)} + 2{}^Rc^{Gr}_{(3,4)}] \cdot$$
$$R_{n-4N}/4 + {}^Rc^B_{(1,4)} \cdot R_{n-4N+2}/4 + [{}^Rc^B_{(3,2)} + {}^Rc^B_{(3,4)} +$$
$$2{}^Rc^{Gb}_{(3,2)}] \cdot R_{n-2}/4 + [4{}^Rc^R_{(3,2)} +$$
$$2({}^Rc^{Gr}_{(3,2)} + {}^Rc^{Gr}_{(3,4)} + {}^Rc^{Gb}_{(1,2)} + {}^Rc^{Gb}_{(3,2)}) +$$
$$({}^Rc^B_{(1,2)} + {}^Rc^B_{(1,4)} + {}^Rc^B_{(3,2)} + {}^Rc^B_{(3,4)})] \cdot R_n/4 +$$
$$[{}^Rc^B_{(1,2)} + {}^Rc^B_{(3,2)} + 2{}^Rc^{Gb}_{(1,2)}] \cdot R_{n+2}/4 + {}^Rc^B_{(3,2)} \cdot$$
$$R_{n+4N-2}/4 + [{}^Rc^B_{(1,2)} + {}^Rc^B_{(3,2)} + 2{}^Rc^{Gr}_{(3,2)}] \cdot R_{n+4N}/4 +$$
$${}^Rc^B_{(1,2)} \cdot R_{n+4N+2}/4 \quad \text{[Equation 1]}$$

(where, $A1_n$ is the red component of the sensing signal sensed by the n-th photo-sensing cell, ${}^\alpha c^\beta_{(\gamma,\delta)}$ is a color separation coefficient and is the ratio of the light that is branched to the photo-sensing cells in the γth row and the δth column when α color light is incident on the β color pixel, $R_\phi$ is a component of the red light corresponding to the φ-th photo-sensing cell excluding the red light introduced from the surrounding photo-sensing cell, and n=4N(i−1)+2j, i=1, 2, . . . , N and j=1, 2, . . . , N)

The processor (250 in FIG. 1) according to an example embodiment may perform decoupling on the red component R. of the sensing signal $A1_n$ using Equation 1.

However, when a solution is obtained in the form of a general linear equation using an application processor mounted on a portable electronic product, such as a mobile phone or tablet PC, a high computational load is generated, which may delay image processing.

When the arrangement of the color separation lens array (300 in FIG. 5) and the color filter array (CFA) applied to the image sensor (200 in FIG. 5) is repetitive, a one-dimensional kernel exists that connects the sensing signal ($A1_n$ in Equation 1) measured by the image sensor (200 in FIG. 5) to the signal to be actually obtained ($R_n$ in Equation 1) due to the linear shift invariability of the system, and each component of the kernel may be determined by the point spread function of the image system.

The processor (250 of FIG. 1) according to an example embodiment may convert the polynomial of Equation 1 into a convolutional form as shown in Equation 2 below.

$$A1_n = R_n * h_n^R \quad \text{[Equation 2]}$$

(where, $A1_n$ is the red component of the sensing signal sensed by the n-th photo-sensing cell, $R_n$ is a component of the red light corresponding to the n-th photo-sensing cell excluding the red light introduced from the surrounding photo-sensing cell, and $h_n$ is the red light kernel.)

In this case, the red light kernel determined from Equation 1 may be expressed as a linear combination of nine parameters as follows.

$$[{}^Rc^B_{(1,2)}/4, [{}^Rc^B_{(1,2)} + {}^Rc^B_{(3,2)} + 2{}^Rc^{Gr}_{(3,2)}]/4, {}^Rc^B_{(3,2)}/4,$$
$$[{}^Rc^B_{(1,2)} + {}^Rc^B_{(1,4)} + 2{}^Rc^{Gb}_{(1,2)}]/4, [4{}^Rc^R_{(3,2)} +$$
$$2({}^Rc^{Gr}_{(3,2)} + {}^Rc^{Gr}_{(3,4)} + {}^Rc^{Gb}_{(1,2)} + {}^Rc^{Gb}_{(3,2)}) +$$
$$({}^Rc^B_{(1,2)} + {}^Rc^B_{(1,4)} + {}^Rc^B_{(3,2)} + {}^Rc^B_{(3,4)})]/4, [{}^Rc^B_{(3,2)} +$$
$${}^Rc^B_{(3,4)} + 2{}^Rc^{Gb}_{(3,2)}]/4, {}^Rc^B_{(1,4)}/4, [{}^Rc^B_{(1,4)} +$$
$${}^Rc^B_{(3,4)} + 2{}^Rc^{Gr}_{(3,4)}]/4, {}^Rc^B_{(3,4)}/4]$$

In other words, $h_{-4N-2}^R = {}^Rc^B_{(1,2)}/4$, $h_{-4N}^R = [{}^Rc^B_{(1,2)} + {}^Rc^B_{(3,2)} + 2{}^Rc^{Gr}_{(3,2)}]/4$, $h_{-4N+2}^R = {}^Rc^B_{(3,2)}/4$, $h_{-2}^R = [{}^Rc^B_{(1,2)} + {}^Rc^B_{(1,4)} + 2{}^Rc^{Gb}_{(1,2)}]/4$, $h_0^R = [4{}^Rc^R_{(3,2)} + 2({}^Rc^{Gr}_{(3,2)} + {}^Rc^{Gr}_{(3,4)} + {}^Rc^{Gb}_{(1,2)} + {}^Rc^{Gb}_{(3,2)}) + ({}^Rc^B_{(1,2)} + {}^Rc^B_{(1,4)} + {}^Rc^B_{(3,2)} + {}^Rc^B_{(3,4)})]/4$, $h_2^R = [{}^Rc^B_{(3,2)} + {}^Rc^B_{(3,4)} + 2{}^Rc^{Gb}_{(3,2)}]/4$, $h_{4N-2}^R = {}^Rc^B_{(1,4)}/4$, $h_{4N}^R = [{}^Rc^B_{(1,4)} + {}^Rc^B_{(3,4)} + 2{}^Rc^{Gr}_{(3,4)}]/4$, and $h_{4N+2}^R = {}^Rc^B_{(3,4)}/4$.

The processor (250 of FIG. 1) according to an example embodiment may calculate the component $R_n$ of the red light corresponding to the n-th photo-sensing cell as shown in Equation 3 below, by performing Fourier transform on Equation 2, dividing by Fourier pairs of the red light kernel $h_n^R$, and then performing inverse Fourier transform.

$$R_n = FFT^{-1}[FFT(A1_n)/FFT(h_n^R)] \quad \text{[Equation 3]}$$

(where, $A1_n$ is the red component of the sensing signal sensed by the n-th photo-sensing cell, $R_n$ is a component of the red light corresponding to the n-th photo-sensing cell excluding the red light introduced from the surrounding photo-sensing cell, and $h_n^R$ is the red light kernel.)

The advantage of the above calculation method is that the amount of calculation may be significantly reduced by replacing a general linear equation with a deconvolution problem by a given one-dimensional kernel.

On the other hand, the decoupling with respect to the blue component for each of the plurality of pixels may be performed in consideration of a blue component passing through one blue pixel among the plurality of pixels and a blue component passing through a plurality of surrounding pixels (example: 8 surrounding pixels surrounding one pixel in Bayer pattern array) in contact with the blue pixel. For example, the blue component of the pixels (2, 3) shown in FIG. 13 may be determined in consideration of signals incident to eight pixels surrounding the pixels (2, 3) in addition to the signal measured in the pixels (2, 3). For example, ½ of signals of each of the four green pixels (1,3), (2,2), (2,4), and (3,3), and ¼ of the signals of each of the four red pixels (1,2), (1,4), (3,2), and (3,4) may be considered as a blue component.

The processor (250 of FIG. 1) may perform decoupling on the blue component $B_n$ of the sensing signal $A2_n$ using Equation 4 below.

$$A2_n = {}^Bc^R_{(4,3)} \cdot B_{n-4N-2}/4 + [{}^Bc^R_{(2,3)} + {}^Bc^R_{(4,3)} + 2{}^Bc^{Gb}_{(2,3)}] \cdot$$
$$B_{n-4N}/4 + {}^Bc^R_{(2,3)} \cdot B_{n-4N+2}/4 + [{}^Bc^R_{(4,1)} + {}^Bc^R_{(4,3)} +$$
$$2{}^Bc^{Gr}_{(4,3)}] \cdot B_{n-2}/4 + [4{}^Bc^B_{(2,3)} + 2({}^Bc^{Gb}_{(2,1)} +$$
$${}^Bc^{Gb}_{(2,3)} + {}^Bc^{Gr}_{(2,3)} + {}^Bc^{Gr}_{(4,3)}) + ({}^Bc^R_{(2,1)} + {}^Bc^R_{(2,3)} +$$
$${}^Bc^R_{(4,1)} + {}^Bc^R_{(4,3)})] \cdot B_n/4 + [{}^Bc^R_{(2,1)} + {}^Bc^R_{(2,3)} +$$
$$2{}^Bc^{Gr}_{(2,3)}] \cdot B_{n+2}/4 + {}^Bc^R_{(4,1)} \cdot B_{n+4N-2}/4 + [{}^Bc^R_{(2,1)} +$$
$${}^Bc^R_{(4,1)} + 2{}^Bc^{Gb}_{(2,1)}] \cdot B_{n+4N}/4 + {}^Bc^R_{(2,1)} \cdot B_{n+4N+2}/4 \quad \text{[Equation 4]}$$

(where, $A2_n$ is the blue component of the sensing signal sensed by the n-th photo-sensing cell, ${}^\alpha c^\beta_{(\gamma, \delta)}$ is a color separation coefficient and is the ratio of the light that is branched to the photo-sensing cells in the γth row and the δth column when a color light is incident on the β color pixel, Bo is a component of the blue light corresponding to the φ-th photo-sensing cell excluding the blue light introduced from the surrounding photo-sensing cell, and n=2N(2i−1)+(2j−1), i=1, 2, . . . , N and j=1, 2, . . . , N)

The processor (250 of FIG. 1) may convert the polynomial of Equation 4 into a convolutional form as shown in Equation 5 below.

$$A2_n = B_n * h_n^B \quad \text{[Equation 5]}$$

(where, $A2_n$ is a blue component of the sensing signal sensed by the n-th photo-sensing cell, $B_n$ is a component of blue light corresponding to the n-th photo-sensing cell excluding the blue light introduced from the surrounding photo-sensing cell, $h_n^B$ is a blue light kernel.)

The processor (250 of FIG. 1) may calculate the component $B_n$ of the blue light corresponding to the n-th photo-sensing cell as shown in Equation 6 below, by performing Fourier transform on Equation 5, dividing by Fourier pairs of the blue light kernel $h_n^B$, and then performing inverse Fourier transform.

$$B_n = FFT^{-1}[FFT(A2_n)/FFT(h_n^B)] \quad \text{[Equation 6]}$$

(where, $A2_n$ is the blue component of the sensing signal sensed by the n-th photo-sensing cell, $B_n$ is a component of blue light corresponding to the n-th photo-sensing cell except for the blue light introduced from the surrounding photo-sensing cell, and $h_n^B$ is the blue light kernel.)

On the other hand, the decoupling with respect to a first green component for each of the plurality of pixels may be performed in consideration of a green component passing through one green pixel (e.g., Gb) among the plurality of pixels and a green component passing through a plurality of surrounding pixels (example: 8 surrounding pixels surrounding one pixel in Bayer pattern array) in contact with the green pixel (e.g., Gb). For example, the green component of the pixels (2, 2) shown in FIG. 13 may be determined in consideration of signals incident to eight pixels surrounding the pixels (2, 2) in addition to the signal measured in the pixels (2, 2). For example, ¼ of signals of each of the two red pixels (1,2) and (3,2), ¼ of signals of each of the two blue pixels (2,1) and (2,3), and ¼ of the signals of each of the four green pixels (1,1), (1,3), (3,1), and (3,3) may be considered as a green component.

The processor (250 of FIG. 1) may perform decoupling on the green component $G$. of the sensing signal $A3_n$ using Equation 7 below.

$$A3_n = {}^G c^B_{(2,4)} \cdot G_{n-4N}/2 + {}^G c^{Gr}_{(4,4)} \cdot G_{n-2N-1} + {}^G C^{Gr}_{(2,4)} \cdot G_{n-2N+1} + {}^G c^R_{(4,2)} \cdot G_{n-2}/2 + [{}^G c^R_{(2,2)} + {}^G c^R_{(4,2)} + {}^G c^B_{(2,2)} + {}^G c^B_{(2,4)} + 2 {}^G c^{Gb}_{(4,4)}] \cdot G_n/2 + {}^G c^R_{(2,2)} \cdot G_{n+2}/2 + {}^G C^{Gr}_{(4,2)} \cdot G_{n+2N-1} + {}^G C^{Gr}_{(2,2)} \cdot G_{n+2N+1} + {}^G c^B_{(2,2)} \cdot G_{n+4N}/2 \quad \text{[Equation 7]}$$

(where, $A3_n$ is the first green component of the sensing signal sensed by the n-th photo-sensing cell, ${}^\alpha c^\beta_{(\gamma,\delta)}$ is a color separation coefficient and is the ratio of the light that is branched to the photo-sensing cells in the γth row and the δth column when a color light is incident on the β color pixel, $G_\phi$ is a component of a first green light corresponding to the φ-th photo-sensing cell excluding the first green light introduced from the surrounding photo-sensing cell, and n=4N(i−1)+(2j−1), i=1, 2, . . . , N and j=1, 2, . . . , N)

The processor (250 of FIG. 1) may convert the polynomial of Equation 7 into a convolutional form as shown in Equation 8 below.

$$A3_n = G_n * h_n^G \quad \text{[Equation 8]}$$

(where, $A3_n$ is the first green component of the sensing signal sensed by the n-th photo-sensing cell, $G_n$ is a component of the first green light corresponding to the n-th photo-sensing cell except for the first green light introduced from the surrounding photo-sensing cell, and $h_n^G$ is the first green light kernel.)

The processor (250 of FIG. 1) may calculate the component $G_n$ of the first green light corresponding to the n-th photo-sensing cell as shown in Equation 9 below, by performing Fourier transform on Equation 8, dividing by Fourier pairs of the first green component kernel $h_n^G$, and then performing inverse Fourier transform.

$$G_n = FFT^{-1}[FFT(A3_n)/FFT(h_n^G)] \quad \text{[Equation 9]}$$

(where, $A3_n$ is the first green component of the sensing signal sensed by the n-th photo-sensing cell, $G_n$ is a component of the first green light corresponding to the n-th photo-sensing cell except for the first green light introduced from the surrounding photo-sensing cell, and $h_n^G$ is the first green light kernel.)

On the other hand, the decoupling with respect to a second green component for each of the plurality of pixels may be performed in consideration of a green component passing through one green pixel (e.g., Gr) among the plurality of pixels and a green component passing through a plurality of surrounding pixels (example: 8 surrounding pixels surrounding one pixel in Bayer pattern array) in contact with the green pixel. For example, the green component of the pixels (3, 3) shown in FIG. 13 may be determined in consideration of signals incident to eight pixels surrounding the pixels (3, 3) in addition to the signal measured in the pixels (3, 3). For example, ¼ of signals of each of the four red pixels (1,2), (1,4), (3,2), and (3,4), and ½ of the signals of each of the four blue pixels (1,3), (2,2), (2,4), and (3,3) may be considered as a green component.

The processor (250 of FIG. 1) may perform decoupling on the second green component $G_n$ of the sensing signal $A4_n$ using Equation 10 below.

$$A4_n = {}^G c^R_{(3,3)} \cdot G_{n-4N}/2 + {}^G c^{Gb}_{(3,3)} \cdot G_{n-2N-1} + {}^G C^{Gb}_{(1,3)} \cdot G_{n-2N+1} + {}^G c^B_{(3,3)} \cdot G_{n-2}/2 + [{}^G c^R_{(3,1)} + {}^G c^R_{(3,3)} + {}^G c^B_{(1,3)} + {}^G c^B_{(3,3)} + 2 {}^G C^{Gr}_{(3,3)}] \cdot G_n/2 + {}^G c^B_{(1,3)} \cdot G_{n+2}/2 + {}^G c^{Gb}_{(3,1)} \cdot G_{n+2N-1} + {}^G c^{Gb}_{(1,1)} \cdot G_{n+2N+1} + {}^G c^R_{(3,1)} \cdot G_{n+4N}/2 \quad \text{[Equation 10]}$$

(where, $A4_n$ is the second green component of the sensing signal sensed by the n-th photo-sensing cell, ${}^\alpha c^\beta_{(\gamma,\delta)}$ is a color separation coefficient and is the ratio of the light that is branched to the photo-sensing cells in the γth row and the δth column when a color light is incident on the β color pixel, $G_\phi$ is a component of the second green light corresponding to the φ-th photo-sensing cell excluding the second green light introduced from the surrounding photo-sensing cell, and n=2N(2i−1)+2j, i=1, 2, . . . , N and j=1, 2, . . . , N)

The processor (250 of FIG. 1) may convert the polynomial of Equation 10 into a convolutional form as shown in Equation 11 below.

$$A4_n = G_n * h_n^G \quad \text{[Equation 11]}$$

(where, $A4_n$ is the second green component of the sensing signal sensed by the n-th photo-sensing cell, $h_n^G$ is a component of the second green light corresponding to the n-th photo-sensing cell except for the second green light introduced from the surrounding photo-sensing cell, and <<mth2>> is the second green light kernel.)

The processor (250 of FIG. 1) may calculate a component of the second green light corresponding to the n-th photo-sensing cell as shown in Equation 12 below, by performing Fourier transform on Equation 11, dividing by Fourier pairs of the second green component kernel $h_n^G$, and then performing inverse Fourier transform.

$$G_n = FFT^{-1}[FFT(A4_n)/FFT(h_n^G)] \quad \text{[Equation 12]}$$

(where, $A4_n$ is the second green component of the sensing signal sensed by the n-th photo-sensing cell, $h_n^G$ is a component of the second green light corresponding to the n-th photo-sensing cell except for the second green light introduced from the surrounding photo-sensing cell, and <<mth2>> is the second green light kernel.)

Figure 14A:
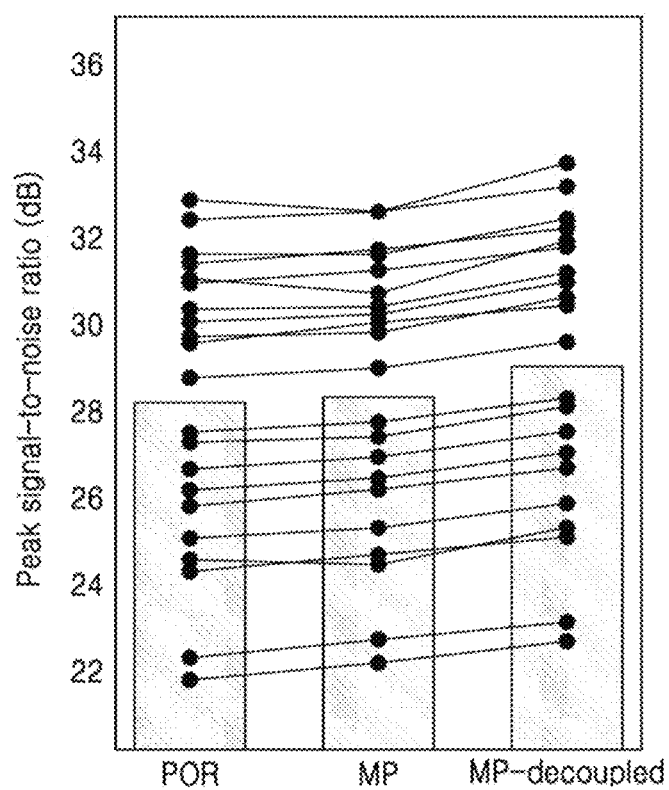
FIG. 14A is a graph showing a peak signal-to-noise ratio (PSNR) indicating spatial correlation with an original image for each embodiment.
Figure 14B:
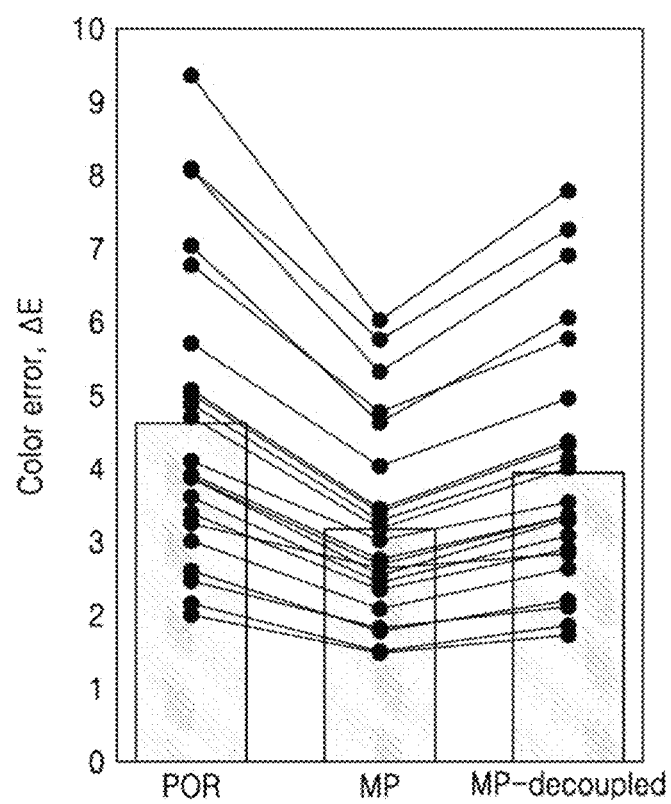
FIG. 14B is a graph showing a color error representing color reproducibility of an original image for each embodiment.
Figure 14C:
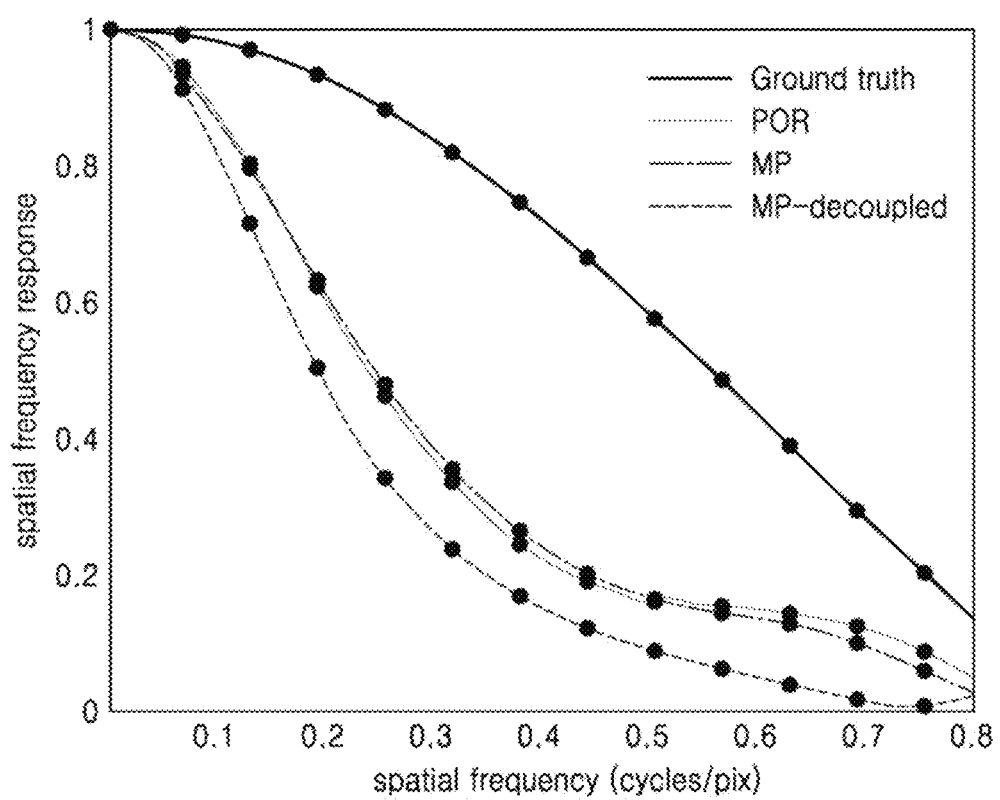
FIG. 14C is a diagram illustrating a modulation transfer function curve (MTF), which is a spatial resolution index.

FIG. 14A is a graph showing a peak signal-to-noise ratio (PSNR) indicating spatial correlation with an original image for each embodiment. FIG. 14B is a graph showing a color error representing color reproducibility of an original image for each embodiment. FIG. 14C is a diagram illustrating a modulation transfer function (MTF) curve, which is a spatial resolution index. In this case, in FIGS. 14A and 14B, POR on the horizontal axis refers to a product of reference, MP refers to an image sensor equipped with a color separation lens array (or meta prism) and applying an existing image processing method, and MP-decoupled refers to an image sensor having a color separation lens array to which a decoupling algorithm is applied.

Referring to FIGS. 14A to 14C, in the image sensor MP having the color separation lens, because spectrum shaping occurs in the direction of lowering the spectrum cross-talk before light is incident on the color filter while including more information on the imaging object compared to the POR corresponding to the related art image sensor that does not pass light of a color that does not correspond to the color filter, the image sensor MP has a higher PSNR value than the POR (see FIG. 14A), and has a lower color error value than the POR (see FIG. 14B). However, because light is mixed depending on wavelength in space, the value of the MTF of the image sensor MP with a color separation lens array has a lower value in the same spatial frequency response compared to the POR (see FIG. 14C).

In this case, the unit of spatial frequency of modulation transfer function (MTF) is cycles/pix, which means how many times a black/white pattern is repeated in 1 pixel, and the spatial frequency response is a ratio of contrast, and as the ration goes from 0 to 1, it may be understood that the imaging object is implemented as an image as it is. The "Ground truth" assumes an ideal modular lens with no external noise, and in general, the higher the spatial frequency, the lower the ratio of contrast, which is the spatial frequency response.

In an image sensor (MP-decoupled) having a color separation lens array to which a decoupling algorithm according to an example embodiment of the present invention is applied, it may be seen that the MTF value (I.e., contrast ratio) is restored to the same level as the POR in terms of resolution.

Figure 15A:
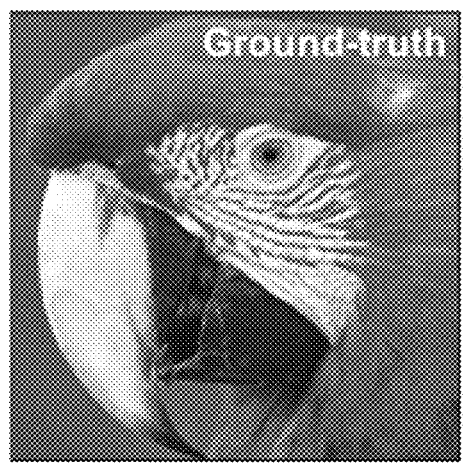
FIG. 15A is an original color image obtained by an ideal module lens (Ground truth)
Figure 15B:
FIG. 15B is a color image obtained by a product of reference (POR)
Figure 15C:
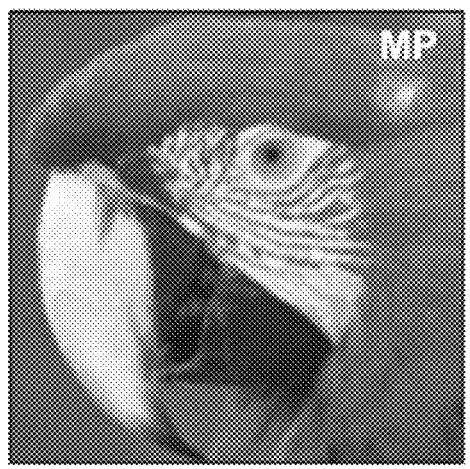
FIG. 15C is a color image obtained by an image sensor MP having a color separation lens array.
Figure 15D:
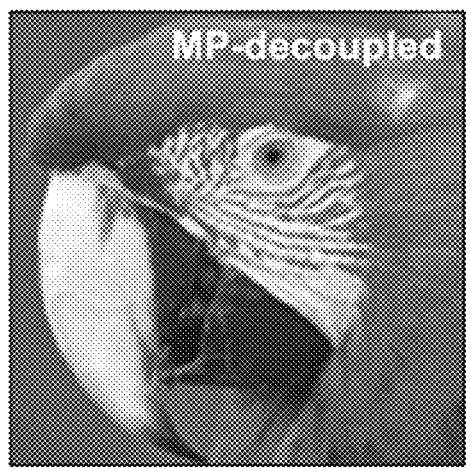
FIG. 15D is a color image obtained by an image sensor (MP-decoupled) that has performed decoupling using a kernel calculated from a point spread function, based on the image signal processing method according to an example embodiment for the color separation lens array 300.

FIG. 15A is an original color image obtained by an ideal module lens (Ground truth), FIG. 15B is a color image obtained by a reference product (POR), FIG. 15C is a color image obtained by an image sensor MP having a color separation lens array, and FIG. 15D is a color image obtained by an image sensor (MP-decoupled) that has performed decoupling using a kernel calculated from a point spread function, based on the image signal processing method according to an example embodiment for the color separation lens array 300.

As may be seen from the comparison of FIGS. 15A to 15C and 15D, when decoupling is performed using a kernel based on the image signal processing method according to the embodiment, it is possible to obtain an image in which an PSNR value compared to the reference product (POR) is excelled, and spatial resolution degradation due to blurring, grid artifacts, and color mixing is improved, so that sharpness in an edge region of an image is increased, and grid artifacts in a flat region are removed. That is, it is possible to improve spatial resolution and spectral resolution of an image while maintaining the effect of improving light efficiency.

Figure 16:
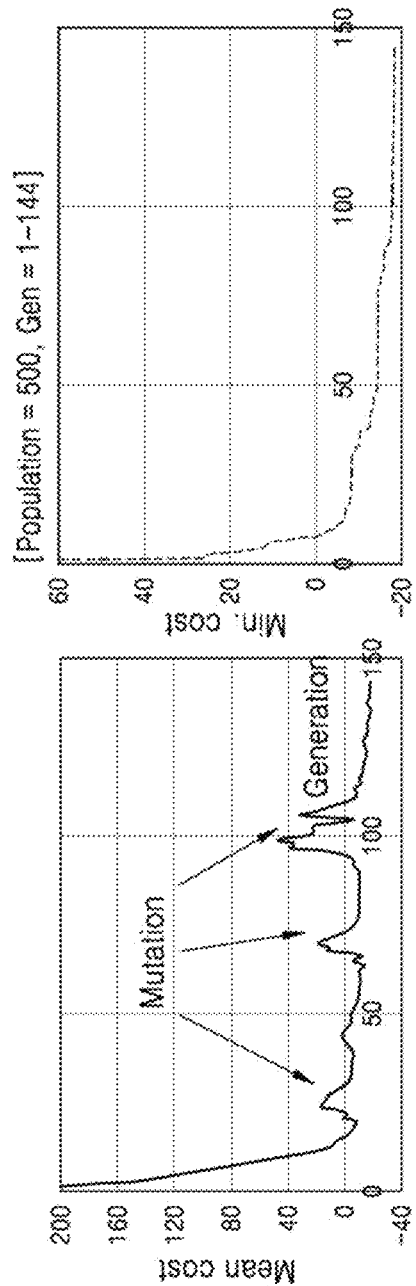
FIG. 16 is a diagram illustrating an application example of a genetic optimization algorithm for optimizing a kernel.
Figure 17A:
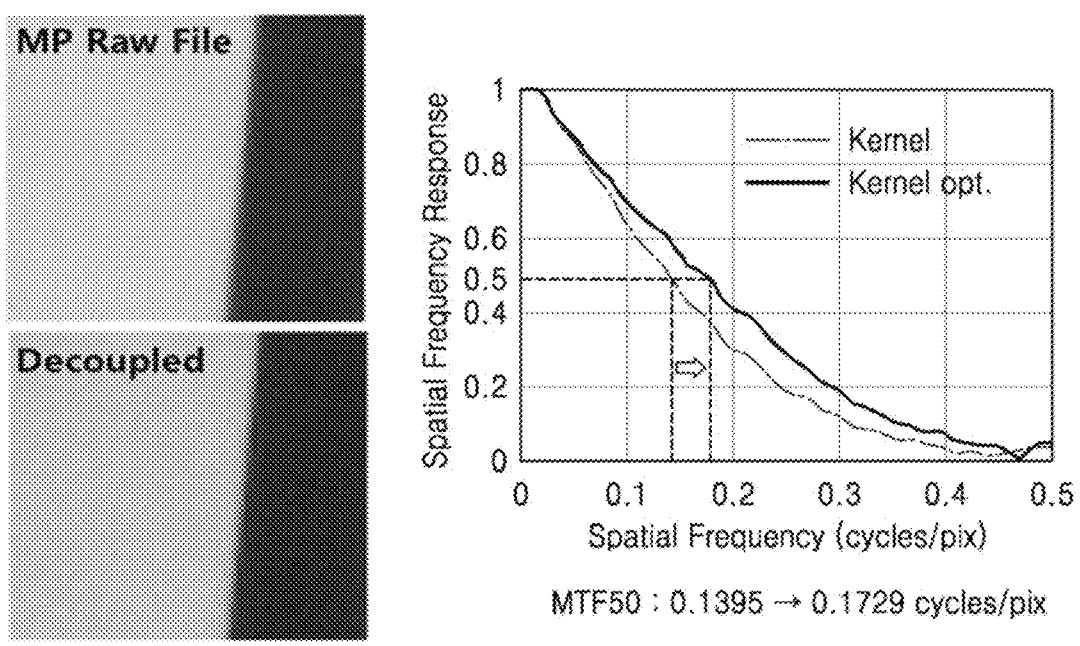
FIG. 17A is a diagram illustrating sloped edge images and a modulation transfer function curve.
Figure 17B:
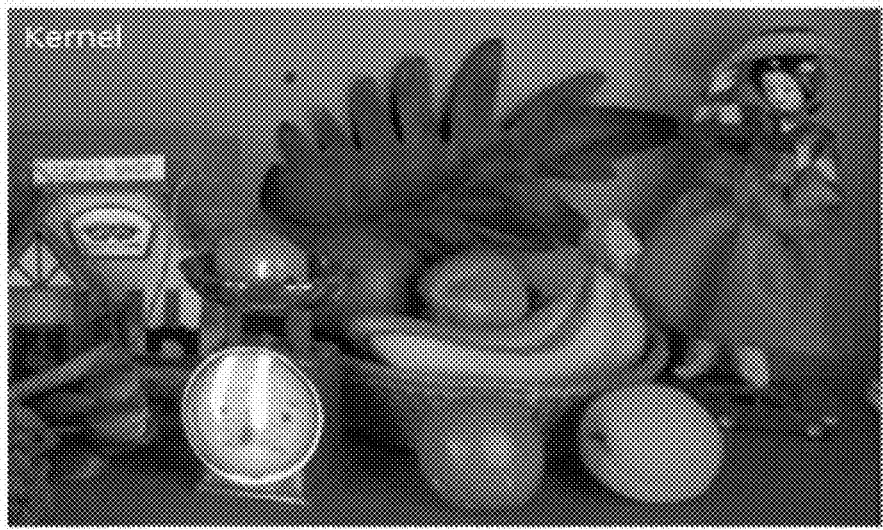
FIG. 17B is a color image obtained by an image sensor to which a kernel is applied.
Figure 17C:
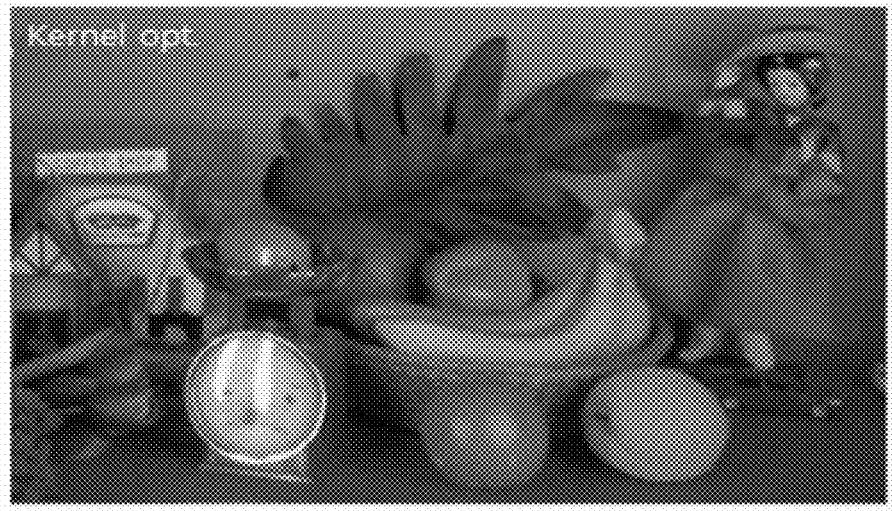
FIG. 17C is a color image obtained by an image sensor to which an optimized kernel is applied.

FIG. 16 is a diagram illustrating an application example of a genetic optimization algorithm for optimizing a kernel. FIG. 17A is a diagram illustrating sloped edge images and a modulation transfer function curve. FIG. 17B is a color image obtained by an image sensor to which a kernel is applied. FIG. 17C is a color image obtained by an image sensor to which an optimized kernel is applied.

Referring to FIG. 16, the processor (250 of FIG. 1) according to an example embodiment may optimize a kernel used for decoupling. According to one embodiment, the processor (250 of FIG. 1) may perform kernel optimization using an image acquired by an image sensor (200 of FIG. 5) having a color separation lens array (see 300 of FIG. 5). For example, as shown in FIG. 16, the processor (250 in FIG. 1) may optimize the kernel in the direction of maximizing the luminance signal-to-noise ratio (YSNR) and MTF50 within the allowable color error range using a genetic optimization algorithm. In this case, the YSNR is one of the general methods for evaluating an image sensor. The high luminance YSNR is mainly affected by the signal to noise ratio (SNR) and crosstalk of the green channel, whereas the low-light YSNR is relatively more affected by the sensitivity of each color channel. In addition, MTF50 means a spatial frequency value when the spatial frequency response (i.e., contrast ratio) of the modulation transfer function is 50%.

Referring to FIG. 17A, graph of the application of the kernel (Kernel) on the right represents the calculated MTF curve (black curve) by applying the point spread function for the kernel to the left slanted edge image (upper left figure), and graph of the application of the application of the optimized kernel (Kernel opt.) on the right represents the calculated MTF curve (red curve) by applying the point spread function for the optimized kernel (Kernel opt.) to the left slanted edge image (lower left figure). Looking at the MTF curve on the right, it may be seen that MTF50 was 0.1395 [cycles/pix] when the kernel was applied, but improved to 0.1729 [cycles/pix] when the optimized kernel (kernel opt.) was applied.

Referring to FIGS. 17A and 17C, compared to the color image when the kernel is applied, in the color image when the optimized kernel (Kernel opt.), the deterioration of spatial resolution due to blurring, grid artifacts, and color mixing may be improved, so that sharpness in an edge region of an image may be increased, and grid artifacts in a flat region may be removed.

Figure 18:
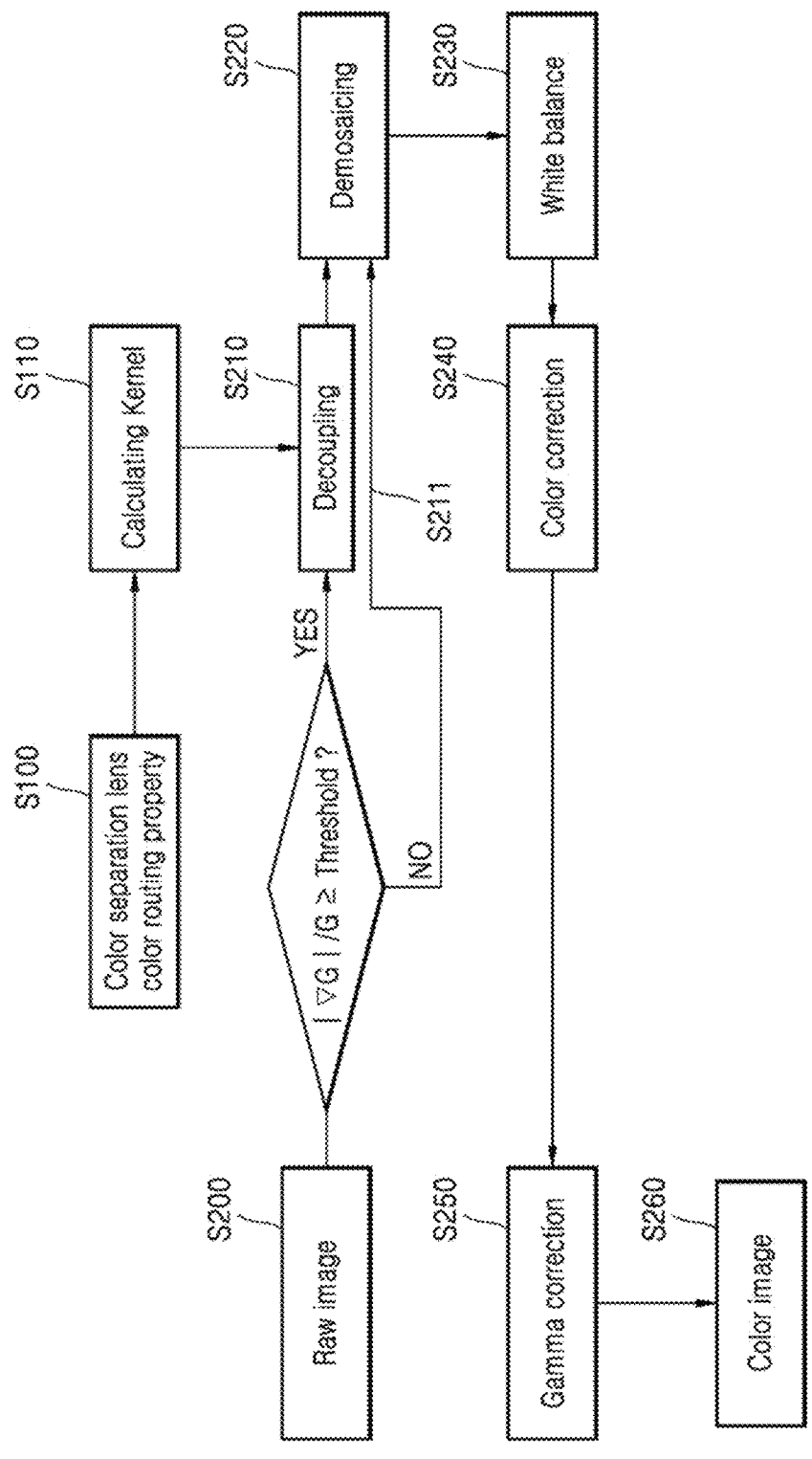
FIG. 18 is a block diagram illustrating a process of processing an image signal for each color obtained by an image sensor of an image acquisition apparatus according to another embodiment.

FIG. 18 is a block diagram illustrating a process of processing an image signal for each color obtained by an image sensor of an image acquisition apparatus according to another embodiment. FIGS. 19A to 19E are diagrams for explaining a process of performing decoupling using gradient information of a captured image.

The embodiment shown in FIG. 18 is different from the embodiment shown in FIG. 11 in that decoupling is omitted based on the received gradient information of the raw image S200 in operation S211 and demosaicing is directly performed on the received raw image S200 in operation S220. Hereinafter, descriptions already given for substantially the same configuration are omitted, and differences are mainly described.

Referring to FIGS. 1, 18, and 19A to 19E, in order to reduce the amount of computation when decoupling is performed in operation S210 of FIG. 11 and at the same time minimize SNR drop in regions where resolution improvement is unnecessary, the processor 250 may perform decoupling only in a specific region of the raw image S200 by using the gradient information of the raw image S200 in operations S210 and S211.

The processor 250 according to an example embodiment may calculate the magnitude $|\nabla G|$ of the gradient $\nabla G$ of the raw image $G(x,y)$ obtained by the image sensor 200. Thereafter, in operation S201, the processor 250 normalizes the gradient value and determines whether the normalized gradient value |∇G|/G of the raw image S200 is greater than or equal to a preset threshold. In operation S210, the processor 250 performs decoupling only in the region where the normalized gradient value |∇G|/G of the raw image S200 is greater than or equal to a preset threshold value. In operations S211 and S220, the processor 250 may directly perform demosaicing on the received raw image S200 without performing decoupling on a region in which the normalized gradient value (|∇G|/G) is less than a preset threshold.

Figure 19A:
FIGS. 19A to 19E are diagrams for explaining a process of performing decoupling using gradient information of a captured image.
Figure 19B:
Figure 19C:
Figure 19D:
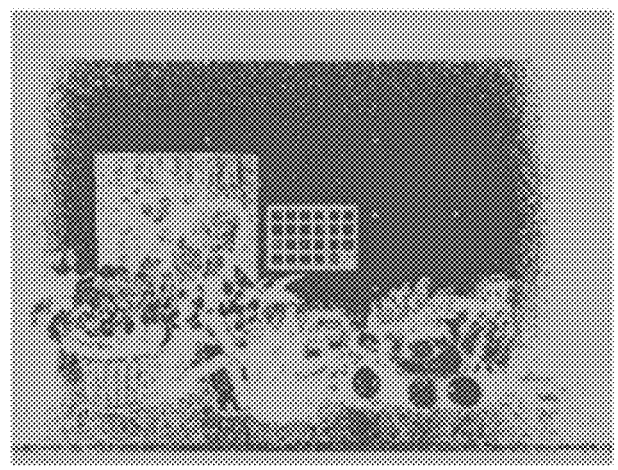

On the other hand, referring to FIGS. 19A and 19D, the outer portion indicated in yellow of FIG. 19D may be determined to be greater than or equal to a preset threshold value despite the dark background of FIG. 19A. This is because the portion where the row signal itself is low is automatically included in the threshold value of the normalized gradient value |∇G|/G reference. In other words, a region darkly expressed along the edge of the drawing shown in FIG. 19A may be greatly affected by noise because the illuminance is low (i.e., the signal itself is low). Accordingly, even if the difference in intensity between the adjacent pixel and the image is not large, it may be determined that the normalized gradient value |∇G|/G is greater than a preset threshold value due to noise.

Figure 19E:
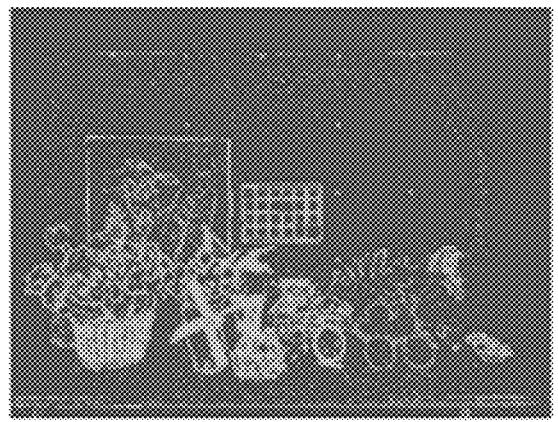

Therefore, referring to FIG. 19E, the processor 250 according to an example embodiment may further consider the size of the raw image (|G|) in determining the region in which the decoupling is performed in the raw image G(x,y) obtained by the image sensor 200. In this case, the size |G| of the raw image may refer to illuminance information of the raw image.

The processor 250 may perform decoupling S210 only on a region in which the size (|G|) of the raw image is greater than or equal to a preset threshold value among regions in which the normalized gradient value |∇G|/G is greater than or equal to a preset threshold. The processor may omit the decoupling S211 and directly perform demosaicing S220 on the received raw image S200 on a region where the normalized gradient value |∇G|/G is less than a preset threshold or a region where the size of the raw image (|G|) is less than the preset threshold even though the gradient value |∇G|/G is greater than or equal to the preset threshold. This is because there is little need to perform decoupling for resolution improvement on a portion having a low signal due to low illuminance.

On the other hand, the processor 250 may also perform decoupling S210 only on a region in which the size of the raw image (|G|) is greater than or equal to a preset threshold value regardless of the normalized gradient value |∇G|/G.

According to an image acquisition apparatus and method according to an example embodiment, for the sensing signal of the photo-sensing cell of the image sensor, by performing decoupling by deconvolution or inverse Fourier transform using a kernel defined from a point spread function determined by the color-routing property of the color-routing property of the color-separating lens array (that is, the phase distribution of the nanostructure of the color-separating lens array), the present invention can reduce the amount of computation and improve the spatial resolution and spectral resolution of an image while maintaining the effect of improving light efficiency.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image acquisition apparatus comprising:
an image sensor comprising:
a sensor substrate comprising a plurality of photo-sensing cells configured to sense light, and
a color separation lens array provided in front of the sensor substrate, the color separation lens array comprising a nanostructure configured to separate incident light by color, wherein the nanostructure is configured to form a phase distribution in a plurality of regions facing the plurality of photo-sensing cells, respectively, and the phase distribution is formed so as to condense light of different wavelengths onto photo-sensing cells adjacent to each other, and
a processor configured to process an image signal for each of a plurality of colors obtained from the image sensor by decoupling sensing signals of the plurality of photo-sensing cells based on a kernel defined from a point spread function determined by the phase distribution.

2. The image acquisition apparatus of claim 1,
wherein the point spread function comprises (k)*(m) parameters, where m is a number of outputs and k is a number of inputs, and
wherein the kernel is expressed as a linear combination of the parameters.

3. The image acquisition apparatus of claim 1, wherein the processor is further configured to perform demosaicing based on the decoupled sensing signal.

4. The image acquisition apparatus of claim 1, wherein the processor is further configured to:
calculate a gradient value of the raw image obtained by the image sensor,
normalize the gradient value, and
perform the decoupling only on a region in the raw image in which the normalized gradient value is greater than or equal to a first threshold.

5. The image acquisition apparatus of claim 1, wherein the processor is further configured to:
calculate a gradient value of the raw image obtained by the image sensor,
calculate an absolute value of the gradient value, and
perform the decoupling only on a region in the raw image in which the absolute value of the gradient is greater than or equal to a second threshold value.

6. The image acquisition apparatus of claim 1,
wherein the image sensor has a Bayer pattern arrangement including a plurality of pixels, and
the processor is further configured to:
obtain an image for each color among a plurality of colors of the Bayer pattern arrangement, and
form a color image by using the obtained image for each of the plurality of colors.

7. The image acquisition apparatus of claim 6, wherein the decoupling of red light for each of the plurality of pixels is performed in consideration of a first component of the red light passing through one red pixel among the plurality of pixels and a second component of the red light passing through a plurality of surrounding pixels in contact with the red pixel.

8. The image acquisition apparatus of claim 6, wherein the processor is further configured to perform decoupling on a red component of the sensing signal by using Equation 1 as follows:

$$A1_n = {}^Rc^B{}_{(3,4)} \cdot R_{n-4N-2}/4 + [{}^Rc^B{}_{(1,4)} + {}^Rc^B{}_{(3,4)} + 2{}^Rc^{Gr}{}_{(3,4)}] \cdot$$
$$R_{n-4N}/4 + {}^Rc^B{}_{(1,4)} \cdot R_{n-4N+2}/4 + [{}^Rc^B{}_{(3,2)} + {}^Rc^B{}_{(3,4)} +$$
$$2{}^Rc^{Gb}{}_{(3,2)}] \cdot R_{n-2}/4 + [4{}^Rc^B{}_{(3,2)} + 2{}^Rc^{Gr}{}_{(3,2)} +$$
$$ {}^Rc^{Gr}{}_{(3,4)} + {}^Rc^{Gb}{}_{(1,2)} + {}^Rc^{Gb}{}_{(3,2)}) + ({}^Rc^B{}_{(1,2)} + {}^Rc^B{}_{(1,4)} +$$
$${}^Rc^B{}_{(3,2)} + {}^Rc^B{}_{(3,4)})] \cdot R_n/4 + [{}^Rc^B{}_{(1,2)} + {}^Rc^B{}_{(1,4)} +$$
$$2{}^Rc^{Gb}{}_{(1,2)}] \cdot R_{n+2}/4 + {}^Rc^B{}_{(3,2)} \cdot R_{n+4N-2}/4 + [{}^Rc^B{}_{(1,2)} +$$
$${}^Rc^B{}_{(3,2)} + 2{}^Rc^{Gr}{}_{(3,2)}] \cdot R_{n+4N}/4 + {}^Rc^B{}_{(1,2)} \cdot R_{n+4N+2}/4,$$

where, $A1_n$ is the red component of the sensing signal sensed by the n-th photo-sensing cell, ${}^\alpha c^\beta{}_{(\gamma,\delta)}$ is a color separation coefficient and is a ratio of the light that is branched to the photo-sensing cells in the γth row and the δth column when a color light is incident on the β color pixel, $R_\phi$ is a component of red light corresponding to the φ-th photo-sensing cell excluding the red light introduced from the surrounding photo-sensing cell, and n=4N(i-1)+2j, i=1, 2, . . . , N and j=1, 2, . . . , N.

9. The image acquisition apparatus of claim 8, wherein the processor is further configured to convert the polynomial of the Equation 1 into a convolutional form using Equation 2 as follows:

$$A1_n = R_n * h_n^R$$

where, $A1_n$ is the red component of the sensing signal sensed by the n-th photo-sensing cell, $R_n$ is a component of the red light corresponding to the n-th photo-sensing cell excluding the red light introduced from the surrounding photo-sensing cell, and $h_n^R$ is a red light kernel.

10. The image acquisition apparatus of claim 9, wherein the processor is further configured to:
perform a Fourier transform on Equation 2,
divide the Fourier transformed Equation 2 by a Fourier pair of the red light kernel, and
perform an inverse Fourier transform to calculate a component of red light corresponding to the n-th photo-sensing cell using Equation 3 as follows:

$$R_n = FFT^{-1}[FFT(A1_n)/FFT(h_n^R)],$$

where, $A1_n$ is the red component of the sensing signal sensed by the n-th photo-sensing cell, $h_n^R$ is a component of the red light corresponding to the n-th photo-sensing cell excluding the red light introduced from the surrounding photo-sensing cell, and $h_n^R$ is the red light kernel.

11. The image acquisition apparatus of claim 6, wherein the processor is further configured to perform decoupling on a blue component of the sensing signal using Equation 4 as follows:

$$A2_n = {}^Bc^R{}_{(4,3)} \cdot B_{n-4N-2}/4 + [{}^Bc^R{}_{(2,3)} + {}^Bc^R{}_{(4,3)} + 2{}^Bc^{Gb}{}_{(2,3)}] \cdot$$
$$B_{n-4N}/4 + {}^Bc^R{}_{(2,3)} \cdot B_{n-4N+2}/4 + [{}^Bc^R{}_{(4,1)} + {}^Bc^R{}_{(4,3)} +$$
$$2{}^Bc^{Gr}{}_{(4,3)}] \cdot B_{n-2}/4 + [4{}^Bc^R{}_{(2,3)} + 2({}^Bc^{Gb}{}_{(2,1)} +$$
$${}^Bc^{Gb}{}_{(2,3)} + {}^Bc^{Gr}{}_{(2,3)} + {}^Bc^{Gr}{}_{(4,3)}) + ({}^Bc^R{}_{(2,1)} + {}^Bc^R{}_{(2,3)} +$$
$${}^Bc^R{}_{(4,1)} + {}^Bc^R{}_{(4,3)})] \cdot B_n/4 + [{}^Bc^R{}_{(2,1)} + {}^Bc^R{}_{(2,3)} +$$
$$2{}^Bc^{Gr}{}_{(2,3)}] \cdot B_{n+2}/4 + {}^Bc^R{}_{(4,1)} \cdot B_{n+4N-2}/4 + [{}^Bc^R{}_{(2,1)} +$$
$${}^Bc^R{}_{(4,1)} + 2{}^Bc^{Gb}{}_{(2,1)}] \cdot B_{n+4N}/4 + {}^Bc^R{}_{(2,1)} \cdot B_{n+4N+2}/4$$

where, $A2_n$ is the blue component of the sensing signal sensed by the n-th photo-sensing cell, ${}^\alpha c^\beta{}_{(\gamma,\delta)}$ is a color separation coefficient and is a ratio of the light that is branched to the photo-sensing cells in the γth row and the δth column when a color light is incident on the β color pixel, $B_\phi$ is a component of blue light corresponding to the φ-th photo-sensing cell excluding the blue light introduced from the surrounding photo-sensing cell, and n=2N(2i-1)+(2j-1), i=1, 2, . . . , N and j=1, 2, . . . , N).

12. The image acquisition apparatus of claim 6, wherein the processor is further configured to perform decoupling on a first green component of the sensing signal by using Equation 7 as follows:

$$A3_n = {}^Gc^B{}_{(2,4)} \cdot G_{n-4N}/2 + {}^Gc^{Gr}{}_{(4,4)} \cdot G_{n-2N-1} + {}^Gc^{Gr}{}_{(2,4)} \cdot$$
$$G_{n-2N+1} + {}^Gc^R{}_{(4,2)} \cdot G_{n-2}/2 + [{}^Gc^R{}_{(2,2)} + {}^Gc^R{}_{(4,2)} +$$
$${}^Gc^B{}_{(2,2)} + {}^Gc^B{}_{(2,4)} + 2{}^Gc^{Gr}{}_{(2,4)} + 2{}^Gc^{Gb}{}_{(4,4)}] \cdot G_n/2 + {}^Gc^R{}_{(2,2)} \cdot G_{n+2}/$$
$$2 + {}^Gc^{Gr}{}_{(4,2)} \cdot G_{n+2N-1} + {}^Gc^{Gr}{}_{(2,2)} \cdot G_{n+2N+1} + {}^Gc^B{}_{(2,2)} \cdot$$
$$G_{n+4N}/2$$

where, $A3_n$ is the first green component of the sensing signal sensed by the n-th photo-sensing cell, ${}^\alpha c^\beta{}_{(\gamma,\delta)}$ is a color separation coefficient and is a ratio of the light that is branched to the photo-sensing cells in the γth row and the δth column when α color light is incident on the β color pixel, $G_\phi$ is a component of first green light corresponding to the φ-th photo-sensing cell excluding the first green light introduced from the surrounding photo-sensing cell, and n=4N(i-1)+(2j-1), i=1, 2, . . . , N and j=1, 2, . . . , N).

13. The image acquisition apparatus of claim 6, wherein the processor is further configured to perform decoupling on a second green component of the sensing signal using Equation 10 as follows:

$$A4_n = {}^Gc^R{}_{(3,3)} \cdot G_{n-4N}/2 + {}^Gc^{Gb}{}_{(3,3)} \cdot G_{n-2N-1} + {}^Gc^{Gb}{}_{(1,3)} \cdot$$
$$G_{n-2N+1} + {}^Gc^B{}_{(3,3)} \cdot G_{n-2}/2 + [{}^Gc^R{}_{(3,1)} + {}^Gc^R{}_{(3,3)} +$$
$${}^Gc^B{}_{(1,3)} + {}^Gc^B{}_{(3,3)} + 2{}^Gc^{Gr}{}_{(3,3)}] \cdot G_n/2 + {}^Gc^B{}_{(1,3)} \cdot G_{n+2}/$$
$$2 + {}^Gc^{Gb}{}_{(3,1)} \cdot G_{n+2N-1} + {}^Gc^{Gb}{}_{(1,1)} \cdot G_{n+2N+1} + {}^Gc^R{}_{(3,1)} \cdot$$
$$G_{n+4N}/2,$$

where, $A4_n$ is the second green component of the sensing signal sensed by the n-th photo-sensing cell, ${}^\alpha c^\beta{}_{(\gamma,\delta)}$ is a color separation coefficient and is a ratio of the light that is branched to the photo-sensing cells in the γth row and the δth column when α color light is incident on the β color pixel, $G_\phi$ is a component of second green light corresponding to the φ-th photo-sensing cell excluding the second green light introduced from the surrounding photo-sensing cell, and n=2N(2i-1)+2j, i=1, 2, . . . , N and j=1, 2, . . . , N).

14. The image acquisition apparatus of claim 1, wherein the color separation lens array is configured to focus the light component among the light incident on a neighboring pixels to the predetermined pixel in addition to a light component corresponding to the predetermined pixel.

15. An image acquisition method in an image acquisition apparatus including an image senor having a sensor substrate with a plurality of photo-sensing cells for sensing light, and a color separation lens array provided in front of the sensor substrate configured to form a phase distribution in a plurality of regions facing the plurality of photo-sensing cells so as to condense light of different wavelengths onto photo-sensing cells adjacent to each other, the method comprising:
obtaining a raw image for each of a plurality of colors with the image sensor;
processing the raw image obtained from the image sensor by decoupling sensing signals of the plurality of photo-sensing cells based on a kernel defined from a point spread function determined by the phase distribution; and
performing demosaicing based on the decoupled sensing signal.

16. The image acquisition method of claim 15,
wherein the point spread function comprises (k)*(m) parameters, where m is a number of outputs and k is a number of inputs, and
wherein the kernel is expressed as a linear combination of the parameters.

17. The image acquisition method of claim 15,
wherein the performing of the decoupling further comprises
calculating a gradient value of the raw image; and
normalizing the gradient value,
wherein the decoupling is performed only on a region in which the normalized gradient value is equal to or greater than a first threshold value in the raw image.

18. The image acquisition method of claim 17, wherein the performing of the decoupling further comprises calculating a size of the raw image,
wherein the decoupling is performed only when the size of the raw image is greater than or equal to a second threshold value in the raw image.

19. The image acquisition method of claim 15, wherein the image sensor has a Bayer pattern arrangement.

20. The image acquisition method of claim 19,
wherein the performing of the decoupling comprises performing decoupling on a red component of the sensing signals using Equation 1 as follows:

$$A1_n = {^R}c^B_{(3,4)} \cdot R_{n-4N-2}/4 + [{^R}c^B_{(1,4)} + {^R}c^B_{(3,4)} + 2{^R}c^{Gr}_{(3,4)}] \cdot R_{n-4N}/4 + {^R}c^B_{(1,4)} R_{n-4N+2}/4 + [{^R}c^B_{(3,2)} + {^R}c^B_{(3,4)} + 2{^R}c^{Gb}_{(3,2)}] \cdot R_{n-2}/4 + [4{^R}c^R_{(3,2)} + 2({^R}c^{Gr}_{(3,2)} + {^R}c^{Gr}_{(3,4)} + {^R}c^{Gb}_{(1,2)} + {^R}c^{Gb}_{(3,2)}) + ({^R}c^B_{(1,2)} + {^R}c^B_{(1,4)} + {^R}c^B_{(3,2)} + {^R}c^B_{(3,4)})] \cdot R_n/4 + [{^R}c^B_{(1,2)} + {^R}c^B_{(1,4)} + 2{^R}c^{Gb}_{(1,2)}] \cdot R_{n+2}/4 + {^R}c^B_{(3,2)} \cdot R_{n+4N-2}/4 + [{^R}c^B_{(1,2)} + {^R}c^B_{(3,2)} + 2{^R}c^{Gr}_{(3,2)}] \cdot R_{n+4N}/4 + {^R}c^B_{(1,2)} \cdot R_{n+4N+2}/4,$$

where, $A1_n$ is the red component of the sensing signal sensed by the n-th photo-sensing cell, ${^\alpha}c^\beta_{(\gamma,\delta)}$ is a color separation coefficient and is the ratio of the light that is branched to the photo-sensing cells in the γth row and the δth column when a color light is incident on the β color pixel, $R_\phi$ is a component of red light corresponding to the φ-th photo-sensing cell excluding the red light introduced from the surrounding photo-sensing cell, and n=4N(i−1)+2j, i=1, 2, . . . , N and j=1, 2, . . . , N.

* * * * *